(12) United States Patent
    Nugent

(10) Patent No.: US 9,121,383 B2
(45) Date of Patent: Sep. 1, 2015

(54) LOW FLOW POWER PLANT

(71) Applicant: Daniel E Nugent, Starksboro, VT (US)

(72) Inventor: Daniel E Nugent, Starksboro, VT (US)

( * ) Notice: Subject to any disclaimer, the term of this patent is extended or adjusted under 35 U.S.C. 154(b) by 267 days.

(21) Appl. No.: 13/763,724

(22) Filed: Feb. 10, 2013

(65) Prior Publication Data

US 2013/0205777 A1    Aug. 15, 2013

Related U.S. Application Data

(60) Provisional application No. 61/597,506, filed on Feb. 10, 2012.

(51) Int. Cl.
    *F03B 7/00*    (2006.01)
    *F03G 3/04*    (2006.01)
    *F03B 17/06*   (2006.01)
    *F03B 17/04*   (2006.01)

(52) U.S. Cl.
    CPC . *F03B 7/00* (2013.01); *F03B 17/04* (2013.01); *Y02E 10/20* (2013.01)

(58) Field of Classification Search
    None
    See application file for complete search history.

(56) References Cited

U.S. PATENT DOCUMENTS 4,209,990 A * 7/1980 Shelton, Jr. .................. 60/640
5,970,713 A * 10/1999 Iorio .............................. 60/640

* cited by examiner

*Primary Examiner* — Christopher Jetton
(74) *Attorney, Agent, or Firm* — Law Office of Arthur M. Antonelli, PLLC

(57) ABSTRACT

A power plant and method for harnessing power from a source of working fluid. The power plant may include a power shaft that includes a first power gear, a first reciprocating engine situated proximate to the power shaft and connected to the first power gear for delivering a power stroke. The first reciprocating engine may include a first bucket assembly which comprises a first bucket mounting frame, a first bucket, and a first connecting mechanism that connects the first bucket to the first bucket mounting frame to form a first hinge that pivots about a first pivot axis such that the first bucket creates a turning moment about the first pivot axis, and a first locking mechanism for selectively locking the first bucket in the first bucket mounting frame.

18 Claims, 18 Drawing Sheets

LOW FLOW POWER PLANT

CROSS REFERENCE TO RELATED APPLICATIONS

This application claims the benefit of U.S. patent application Ser. No. 61/597,506 filed on Feb. 10, 2012, the entire disclosure of which is incorporated by reference herein.

FIELD OF THE INVENTION

The present invention generally relates to a device and system for harnessing energy associated with fluids flowing from a low elevation potential. More particularly, this invention relates to an apparatus and method which is suitable for generating power from a water source characterized by relatively low total dynamic head.

BACKGROUND

Hydropower comes from converting energy in flowing water into useful mechanical power. This power may be converted into electricity using an electric generator or may be used directly to operate machines. In many hydropower systems there may be a head and a flow rate below which there is no advantage in trying to obtain power. Thus, a need exists for a hydropower plant that is operable under low flow conditions.

SUMMARY

The present invention relates to an apparatus and method for harnessing power from a source of working fluid. The apparatus may include a power shaft that includes a first end, a second end spaced from the first end, and a first power gear disposed between the first end and the second end. The apparatus may include a first reciprocating engine situated proximate to the power shaft and connected to the first power gear for delivering a power stroke. The first reciprocating engine may include a first bucket assembly. The first bucket assembly may include a first bucket mounting frame, a first bucket, a first connecting mechanism that connects the first bucket to the first bucket mounting frame to form a first hinge that pivots about a first pivot axis such that the first bucket creates a turning moment about the first pivot axis, and a first locking mechanism for selectively locking the first bucket in the first bucket mounting frame.

The apparatus, further, may include a first bucket filling station for filling the first bucket with working fluid. The first bucket filling station may include a first upper stop and a first lower stop, the first lower stop being selectively moveable between a first deployed position and a first retracted position. The first bucket filling station may further include a first lever for selectively retracting the first lower stop. The first lever being moveable between a first closed position and a first open position such that when the first lever is in the first closed position the first stop is in the first deployed position and when the first lever is in the first open position the first stop is in the first retracted position.

Also, the apparatus may include a working fluid distribution system for delivering working fluid to the first reciprocating engine. The working fluid distribution system may include a tank for storing working fluid, a first fill port in fluid communication with the tank, and a working fluid discharge system for discharging working fluid from the first reciprocating engine to complete the power stroke. Further still, the apparatus may include a first trip switch activator for releasing the first bucket assembly locking mechanism, and a control system for resetting the first reciprocating engine following completion of the power stroke.

In another aspect of the present invention, the first reciprocating engine may include a first counterweight, a first drive chain that comprises a first portion which is connected to the bucket assembly, a second portion which is connected to the first counterweight, and a third portion interconnecting the first portion and the second portion. Further still, the first reciprocating engine may include a first gear set which comprises a first ring gear in working contact with the first power gear for transmitting rotational motion to the power shaft.

In another aspect of the present invention, the first reciprocating engine further comprises a first positioning gear disposed between the first gear set and the first counter weight. The first gear set may include a first transmission gear in working contact with the third portion of the first drive chain, and a first ratcheting mechanism disposed between the first ring gear and first the transmission gear such that rotating the first transmission gear drives the first ring gear in the same direction and counter-rotating the first transmission gear does not affect rotation of the first ring gear.

In another aspect of the present invention, the apparatus may include a second power gear disposed on the power shaft between the first power gear and the second end. Furthermore, the apparatus may include a second reciprocating engine proximate to the power shaft which is connected to the second power gear. The second reciprocating engine may include a second bucket assembly, and a second gear set which comprises a second ring gear in working contact with the second power gear for transmitting rotational motion to the power shaft. The second reciprocating engine further may include a second counterweight and a second drive chain. The second drive chain may include a fourth portion connected to the second bucket assembly, a fifth portion connected to the second counterweight, and a sixth portion interconnecting the fourth portion and the fifth portion.

In another aspect of the present invention, the second reciprocating engine may further include a second transmission gear in working contact with the sixth portion of the second drive chain, and a second ratcheting mechanism disposed between the second ring gear and the second transmission gear such that rotation of the second transmission gear drives the second ring gear in the same direction and counter-rotation of the second transmission gear does not affect rotation of the second ring gear. The second reciprocating engine may further include a second positioning gear disposed between the second gear set and the second counter weight.

In another aspect of the present invention, the apparatus may include a second bucket filling station which includes a second upper stop, a second lower stop, the second lower stop being selectively moveable between a second deployed position and a second retracted position, and a second lever for selectively retracting the second lower stop which comprises a second closed position and a second open position such that when the second lever is positioned in a second closed position the second stop is in the second deployed position and when the second lever is in the second open position the first stop is in the second retracted position.

In another aspect of the present invention, the apparatus water distribution system may include an inflow structure in fluid communication with the tank for conveying working fluid to the apparatus, an outflow structure in fluid communication with the tank, a first drop basin situated hydraulically down gradient of the tank and located below a first target location, a second drop basin situated hydraulically down gradient of the tank and located below a second target location, a spigot in fluid communication with the outflow structure and disposed between the tank and the first and second drop basins such that the spigot is moveable from the first target location to the second target location. The water distribution system may further include a first fill port in fluid communication with the first drop basin which is situated above the first bucket assembly, and a second fill port in fluid communication with the second drop basin, which and situated above the second bucket assembly.

In another aspect of the present invention, the first locking mechanism may include a first strike secured to the first bucket, and a first catch, which comprises a first lever arm, and which is secured to the first bucket mounting frame, the first catch being movable between a first closed configuration such that the first strike is interlocked with the first catch to selectively lock the first bucket in the first bucket mounting frame, and a first open configuration such the first strike is not interlocked with the first catch, and the first catch is biased in the first closed configuration and oscillation of the first lever arm away from the first closed configuration positions the catch in the first open configuration.

In another aspect of the present invention, the first bucket mounting frame includes a plurality of guides to restrain movement of the bucket mounting frame, and the working fluid discharge system further includes a first pair of kick plates disposed below the first bucket assembly and a second pair of kick plates disposed below the second bucket assembly.

In another aspect of the present invention, the control system further may include a first ramp situated below the first pair of kick plates, a first water catch disposed on the first ramp, the first water catch being linked to the second lever such that movement of the first water catch down the first ramp causes the second lever to move to the second position, and causes the spigot to move to the first target location. The control system may further include a second ramp situated below the second pair of kick plates, a second water catch disposed on the first ramp, the first water catch being linked to the first lever such that movement of the second water catch down the second ramp causes the first lever to move to the second position, and causes the spigot to move to the second target location. Additionally, movement of the first water catch down the first ramp may cause the second water catch to move up the second ramp, and movement of the second water catch down the second ramp may cause the first water catch to move up the first ramp.

In another aspect of the invention, the apparatus may include a frame for supporting the first reciprocating engine. The first bucket may include a first kick and the frame may include a brace such that upward movement of the first bucket assembly away from the first pair of kick plates causes the brace to strike the first kick, rotating the first bucket into a vertical orientation and setting the first locking mechanism in the first closed configuration.

In another aspect of the present invention, the second end may be connected to a mechanical device such that rotation of the second end powers the mechanical device. The mechanical device may be a pump or a generator.

Also, the present invention relates to a method of harnessing power from a source of water. The method may include providing the apparatus of the present invention, connecting the source of water to the tank, filling the first bucket with water at the first bucket filling station, retracting the first lower stop to initiate a first power stroke, lowering the first bucket toward the first trip switch activator, rotating the first gear set to drive the first power gear and rotate the power shaft, releasing the first bucket assembly locking mechanism to complete the first power stroke, discharging water from the first reciprocating engine, securing the first bucket on the first lower stop, and powering a mechanical device which is connected to the power shaft.

In another aspect of the present invention, the method may include providing a second reciprocating engine, and operating the first and second reciprocating engines in lead lag operation to rotate the power shaft

DESCRIPTION OF THE DRAWINGS

The accompanying drawings, which are incorporated herein and constitute part of this specification, illustrate an embodiment of the invention, and together with the general description given above and the detailed description given below, serve to explain the features of the invention.

DESCRIPTION

Figure 1:
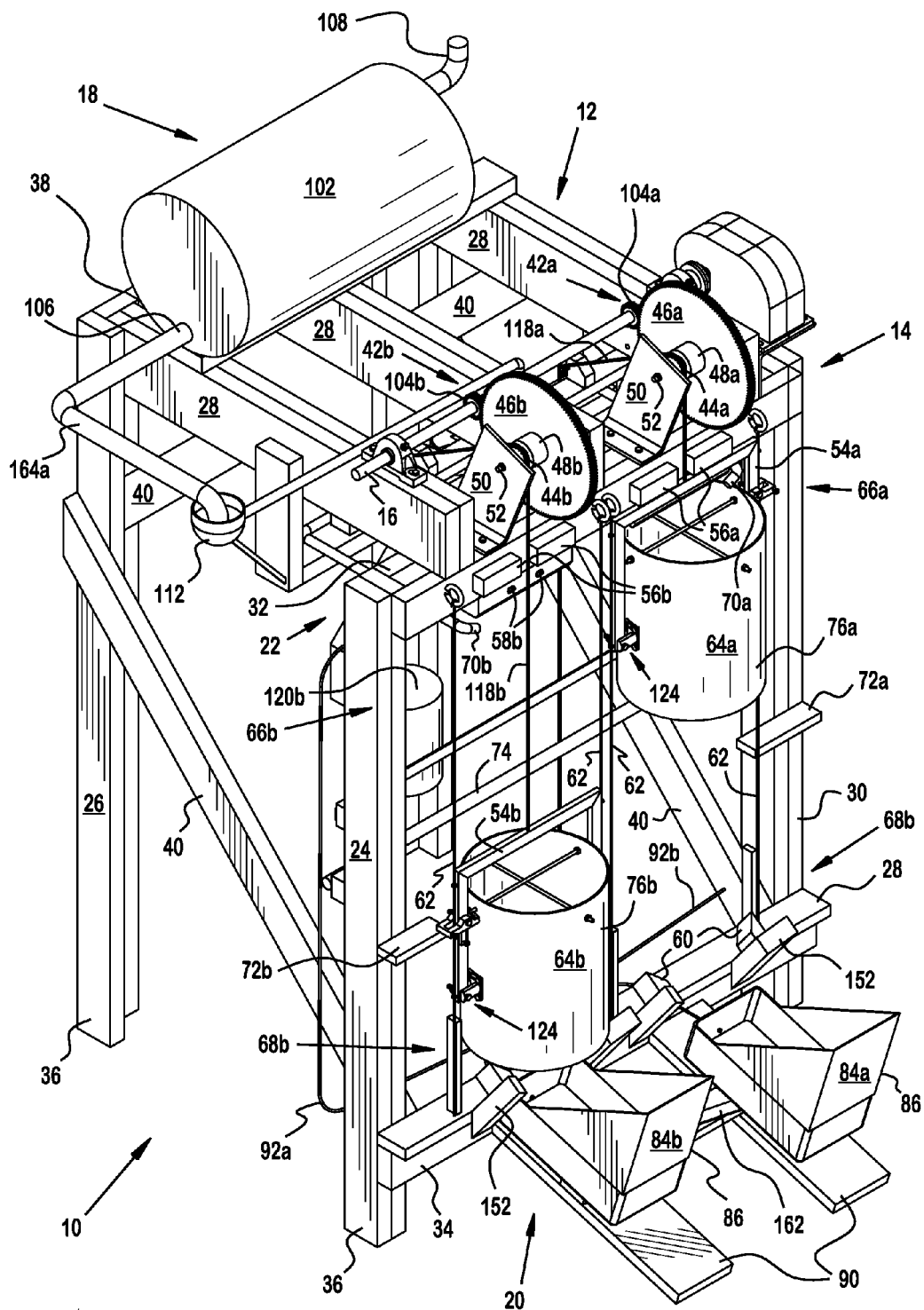
FIG. 1 is a front perspective view of a low flow power plant of the present invention.
Figure 2:
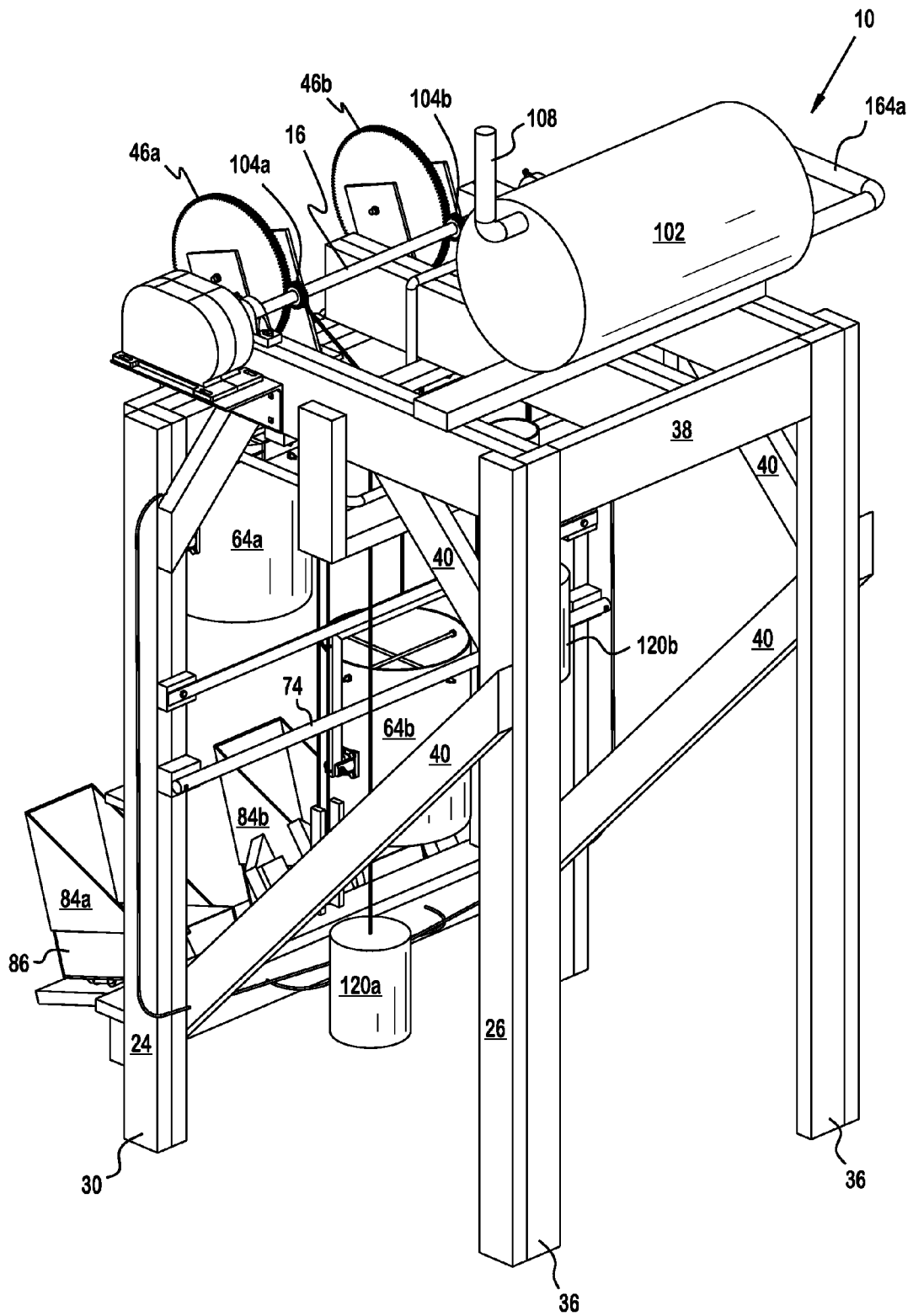
FIG. 2 is a rear perspective view of the power plant of FIG. 1.

FIG. 1 depicts an exemplary embodiment of a power plant 10 of the present invention, which includes a frame 12, two reciprocating engines 14 (herein after 14a (right side reciprocating engine), 14b (left side reciprocating engine)) a power shaft 16, a water distribution system 18, a water discharge system 20, and a control system 22.

As shown in FIG. 1, the frame 12 may include a vertical front partition 24, a vertical rear partition 26, and a number of joists 28 that connect the front and rear partitions. The front partition 24 may include a pair of vertical members 30, a header 32, and a horizontal brace 34. The rear partition 26 may include a pair of vertical members 36, an upper horizontal member 38, and a horizontal brace (not shown). The joist 28 may be spaced perpendicular to the front and rear vertical partitions. The joist may bear on the front partition 24 and may be hung on the rear partition 26. The frame 12 may also include diagonal cross braces 40 to strengthen the structure. In the exemplary embodiment, the frame 12 is made from lumber. Although the frame may be constructed from wood, any suitable material, such as steel, may be used to construct the frame provided the material provides sufficient strength and support to the power plant. In the exemplary embodiment, the frame 12 has a height of approximately 60 inches, a width of approximately 46 inches, and a depth of approximately 38 inches.

The frame 12 may support the other components of the power plant. For example, the front partition 24 may support the reciprocating engines 14a, 14b the water discharge system 20, and elements of the water distribution system 18 and control system 22. Disposed at the top of the front partition are two gear sets (or gearings) 42a, 42b that form part of the reciprocating engines 14a, 14b, which drive the power plant 10. Each gear set 42a, 42b, includes a transmission gear 44a, 44b a ring gear 46a, 46b and an intermediate ratcheting mechanism 48a, 48b. Each ring gear 46a, 46b and transmission gear 44a, 44b may be connected such that turning the transmission gear in one direction (e.g., clockwise) turns the associated ring gear in the same direction, but turning the transmission gear in the opposite direction (e.g., counter-clockwise) does not. The teeth on each ring gear may be cut to transmit power. Each gear 42a, 42b set may be mounted between a pair of opposing steel flanges 50. Each pair of steel flanges 50 may project forward from the front partition, and the axis 52 of each gear set may be positioned and secured by the flanges 50 such that the ring gear 46 set is above the front partition 24 and the forward facing side of the transmission gear 44a, 44b is vertically aligned with the bucket mounting frame 54. In one embodiment, the transmission gear is a 4½ inch diameter steel sprocket and the ring gear is a 12 inch diameter cast iron power gear.

As shown in FIGS. 1, 3, 4 and 6, the front partition 24 may support the working space (or track) of each reciprocating engine 14a, 14b. For example, the front partition 24 may include an upper stop 56a, 56b, a selectively moveable lower stop 58a, 58b, a discharge seat 60, and guide wires 62. Guide wires 62 may form a track that is positioned below a gear set 42a, 42b to constrain movement of the associated bucket assembly 64a, 64b along a generally linear path which traverses between an upper bucket filling station 66a, 66b and a lower bucket discharge station 68a, 68b. The front partition may further include a bucket fill port 70a, 70b proximate to each bucket filling station 66a, 66b and a trip switch activator 72a, 72b for unlatching the bucket assembly 64a, 64b at the discharge station 68a, 68b, as well as a horizontal brace 74 for re-latching the bucket 76a, 76b into a vertical orientation within the bucket assembly 64a, 64b during recoil.

Figures 13, 14:
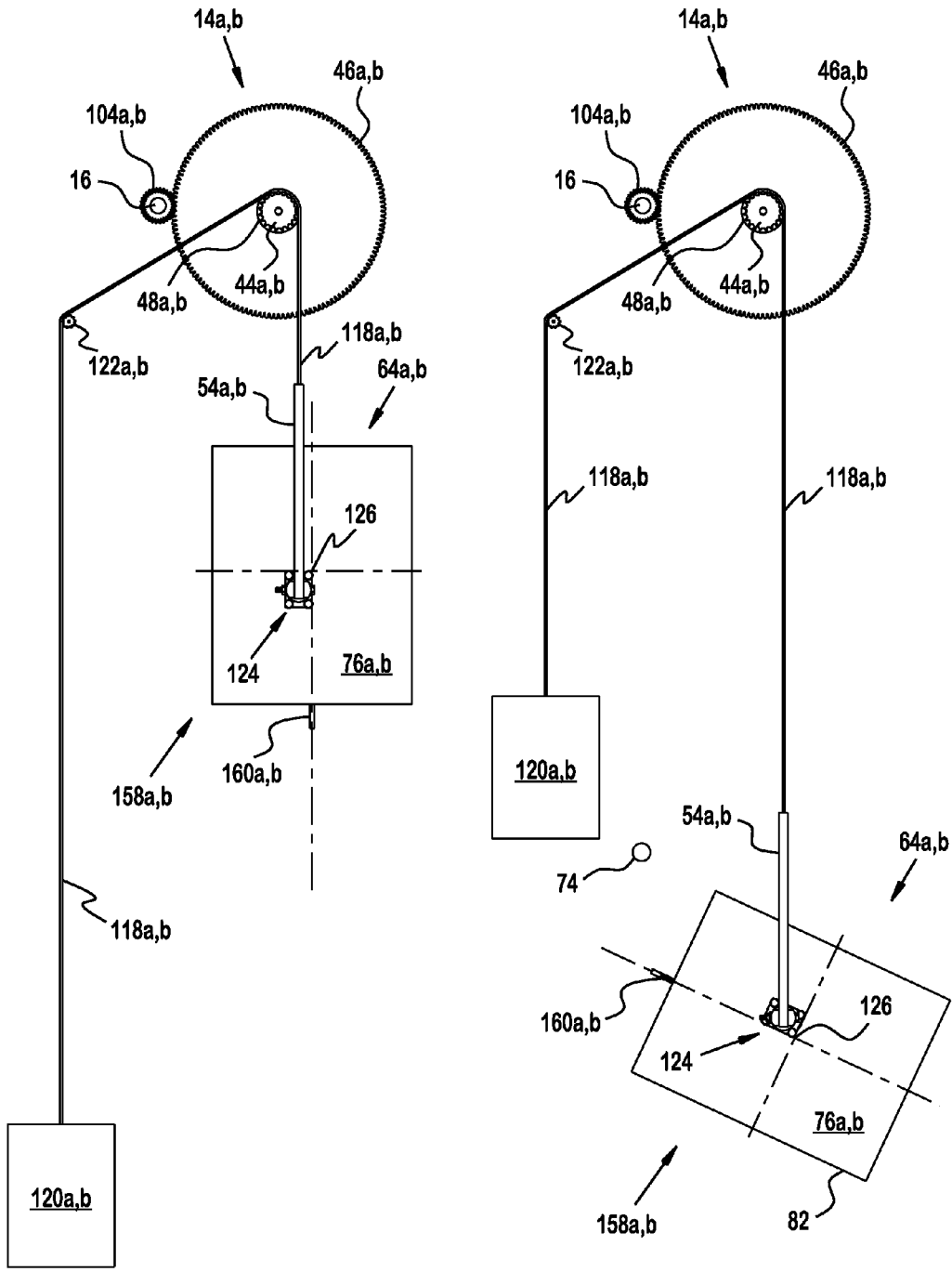
FIG. 13 is a side view of selected components of a reciprocating engine in the fill configuration.
FIG. 14 is a side view of selected components of a reciprocating engine in the discharge configuration.
Figure 17:
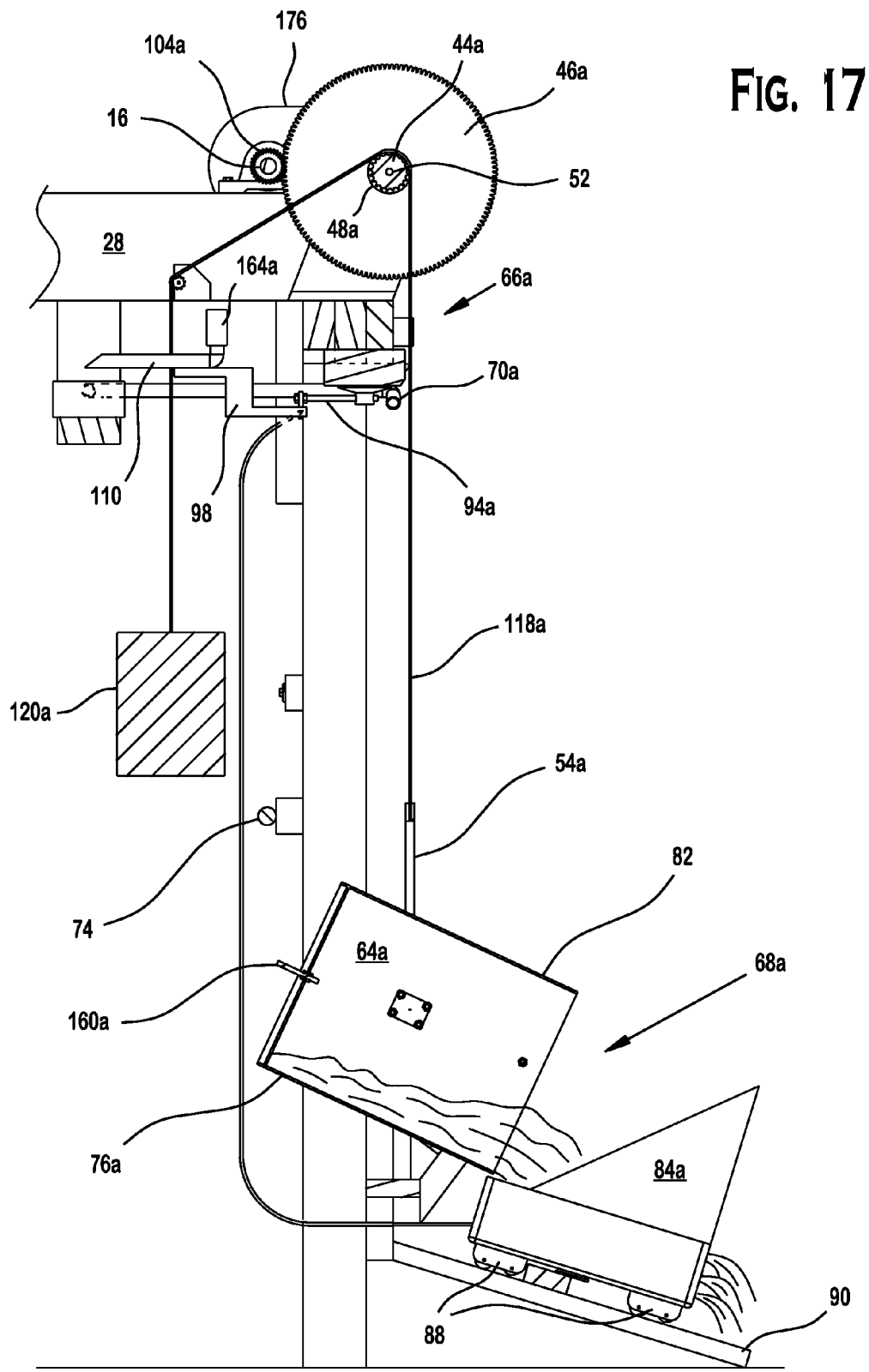
FIG. 17 is a partial sectional view of a reciprocating engine discharging water at the bucket discharge station.

The front partition 24 may support (or include) water discharge stations 68a, 68b. Each water discharge station 68a, 68b may be attached to a horizontal brace (or strap) 34 that is positioned several inches above the base of the frame. The horizontal brace may include an upper ledge 78 that supports the discharge seat 60 and angled kick plates 80, which assist in pivoting the bucket 76a, 76b into the discharge position 82 (FIGS. 14 and 17). The water discharge station further may include a pair of sieves (or water catches) 84a, 84b. Each water catch 84a, 84b may be a container 86 that is mounted on a set of rollers 88 (FIG. 17). The rollers 88 may be disposed on a ramp 90 that slopes downward and away from the upper ledge 78. The ramp 90 may have a slope of approximately 0.3 ft/ft, as the ramp in the disclosed embodiment rises 5½ inches over a horizontal distance of 19 inches.

Figure 15:
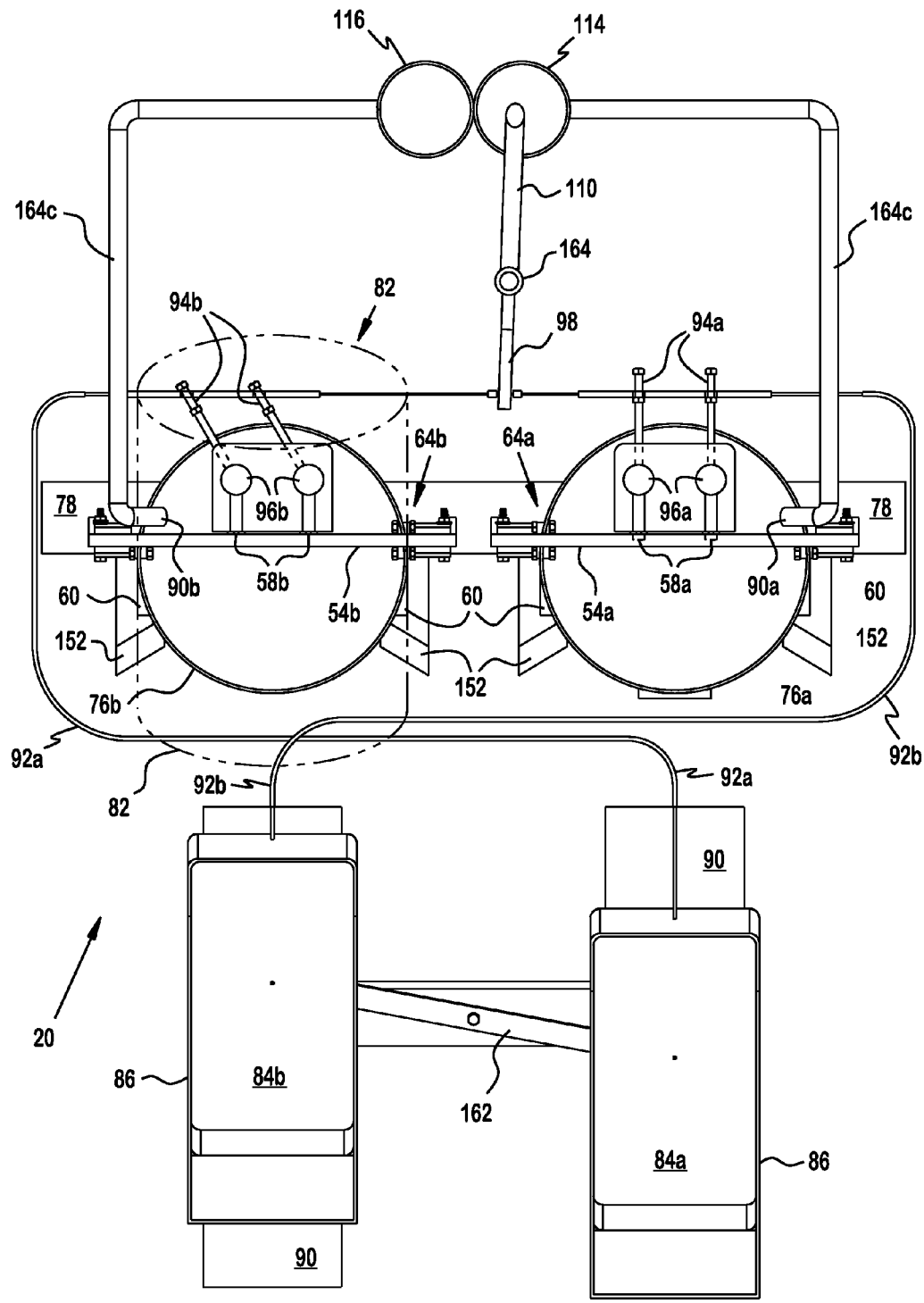
FIG. 15 is a top view of the control system in the right side fill configuration.
Figure 16:
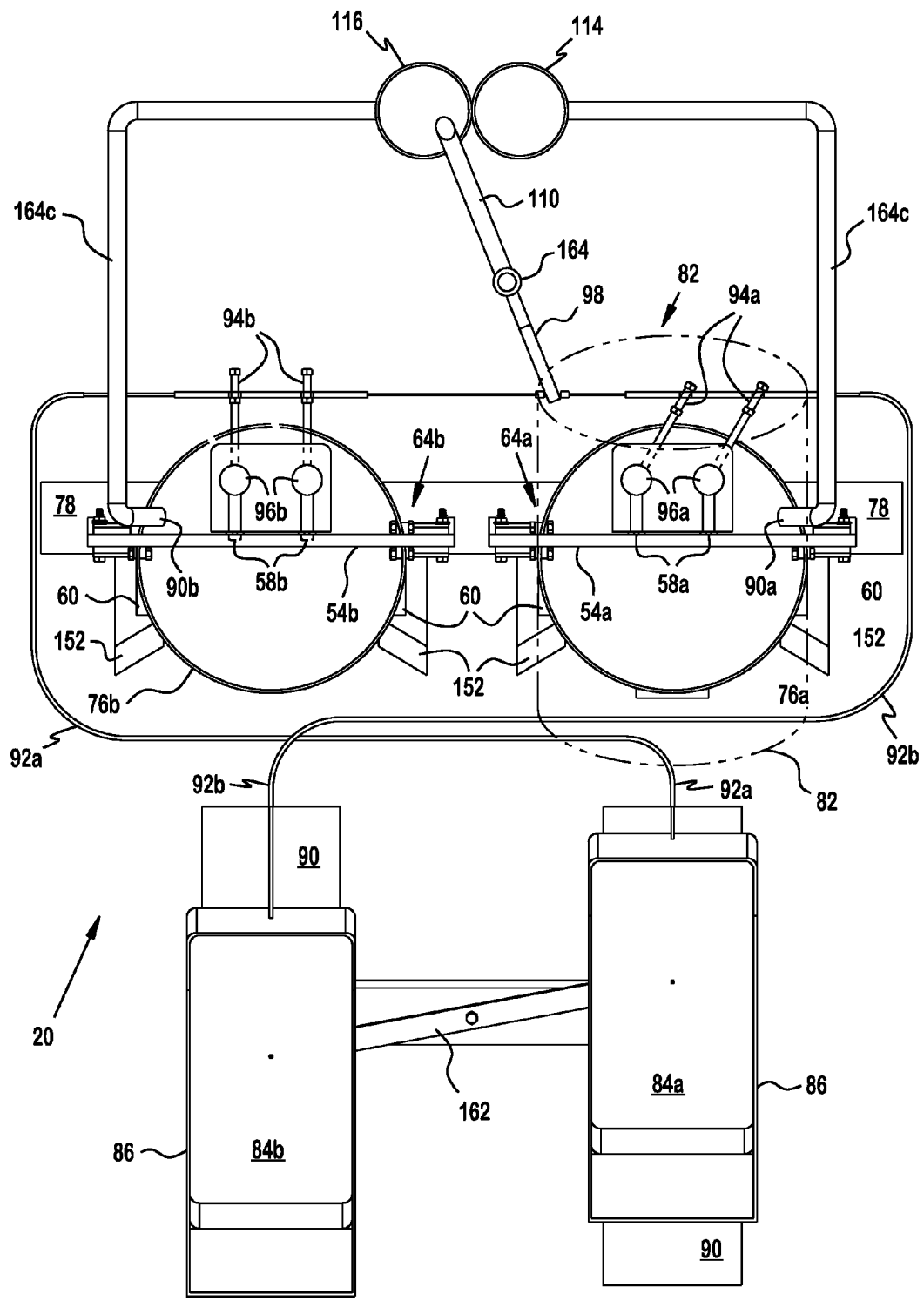
FIG. 16 is a top view of the control system in the left side fill configuration.

Referring to FIGS. 15 and 16, the water catches 84a, 84b may be connected by an elongate member 162 that is free to pivot about a point approximately midway between the water catches. Additionally, a steel cable 92a enclosed with a brake line hose may connect the right water catch 84a to the left selectively moveable lower stop 58b. Similarly, another steel cable 92b enclosed within another brake line hose may connect the left water catch 84b to the right selectively moveable lower stop 58a. The cables 92a, 92b may be threaded through holes or eyelets on the front partition members (not shown). In the exemplary embodiment, the cables are three sixteenth inch (3/16") diameter, steel, brake line cables. More specifically, the cables 92a, 92b may be connected to lever handles 94a, 94b of the respective latch bolts that serve as the selectively moveable lower stops 58a, 58b. Additionally, the handles 94a, 94b may be interconnected to form a closed mechanical control circuit. A lever 98 from the water distribution system, which is secured to the water spigot, may be further connected to the closed mechanical control circuit.

Referring to FIG. 1, the joists may support the power shaft 16, power receiving equipment 100 (e.g., an electrical generator or hydraulic pump), the equalization tank 102, and elements of the water distribution and control systems. The power shaft 16 may be disposed on the top of the ceiling joist. The power shaft may be secured within mounting brackets that are fixed to the ceiling joists. In the exemplary embodiment, the power shaft is made from steel and has a diameter of approximately seven eighths of an inch (7/8"). The power shaft may include two power gears 104a, 104b that each mesh with one of the ring gears 46a, 46b on the front partition. The power gears 104a, 104b and ring gears 46a, 46b being interconnected such that rotation of one ring gear causes the power shaft 16 to rotate. In the exemplary embodiment, the power gears are two inch diameter steel gears. One end portion of the power shaft may form a power take off for operating external equipment or loads. The power take off may possess a non circular cross section such that the power shaft may be able to deliver greater torque to connected equipment that may be mounted and secured on the joists. For instance, without limitation, the connected equipment 100 may be an electrical generator or a hydraulic pump.

Figure 4:
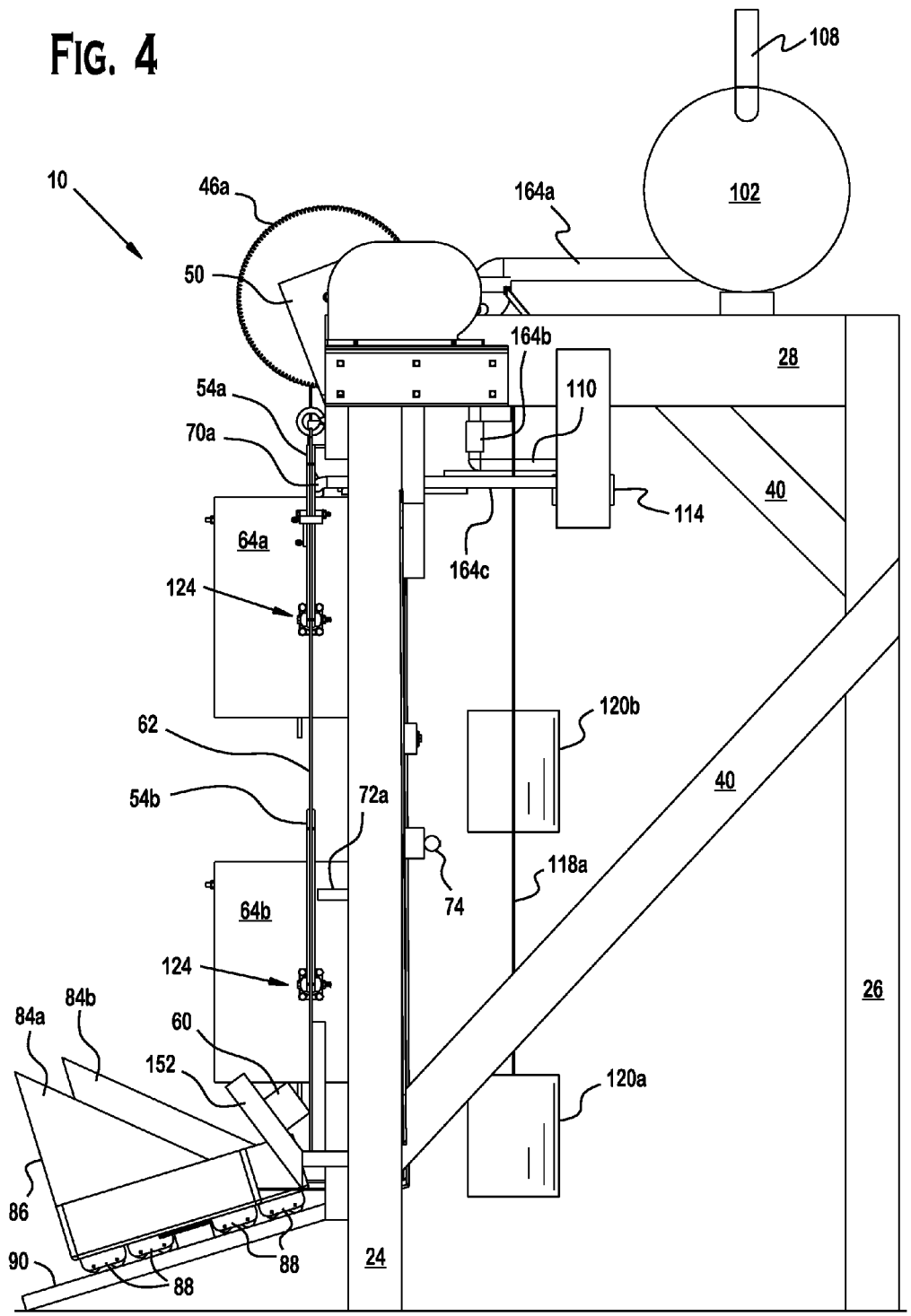
FIG. 4 is a right side view of the power plant of FIG. 1.
Figure 5:
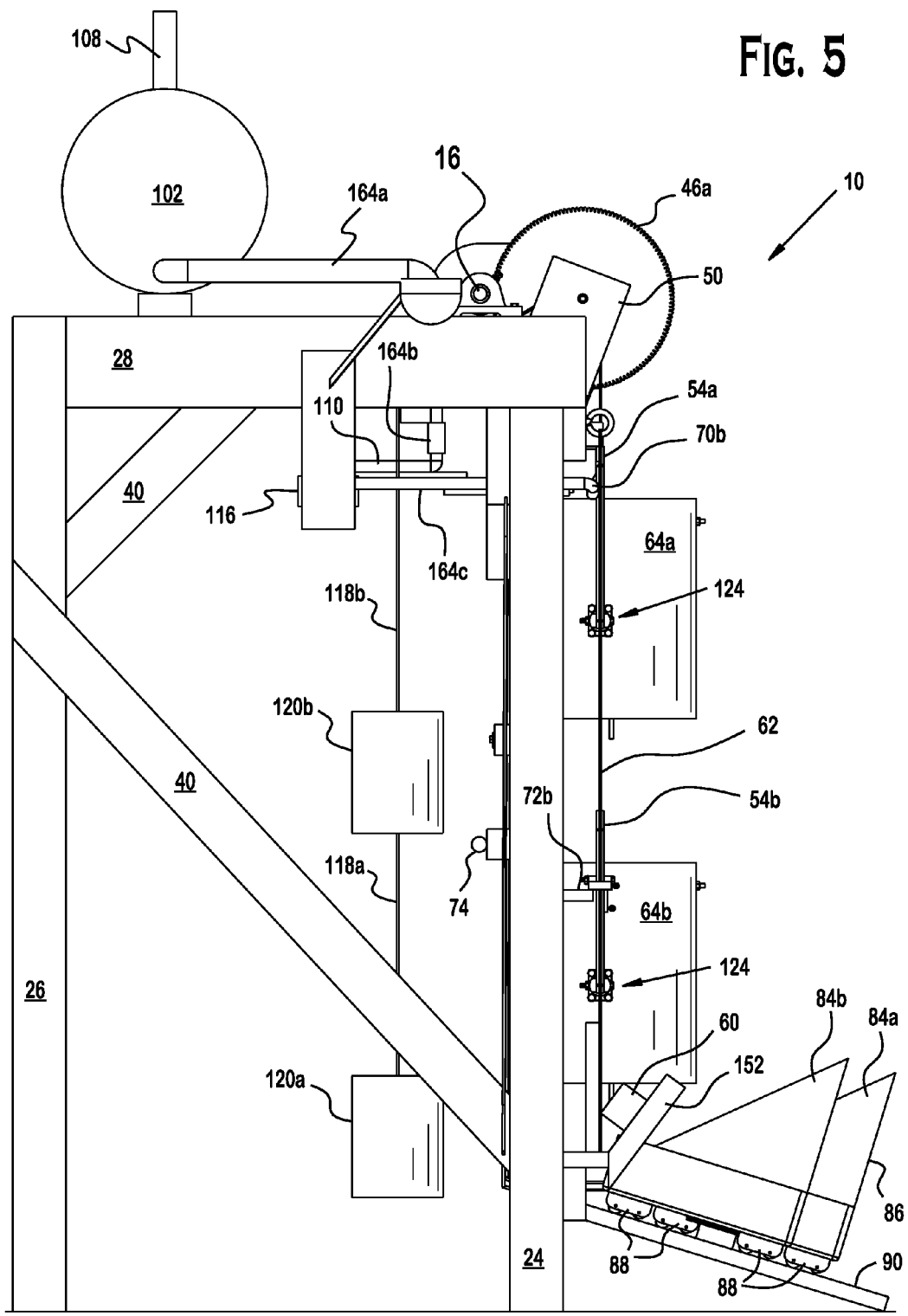
FIG. 5 is a left side view of the power plant of FIG. 1.
Figure 6:
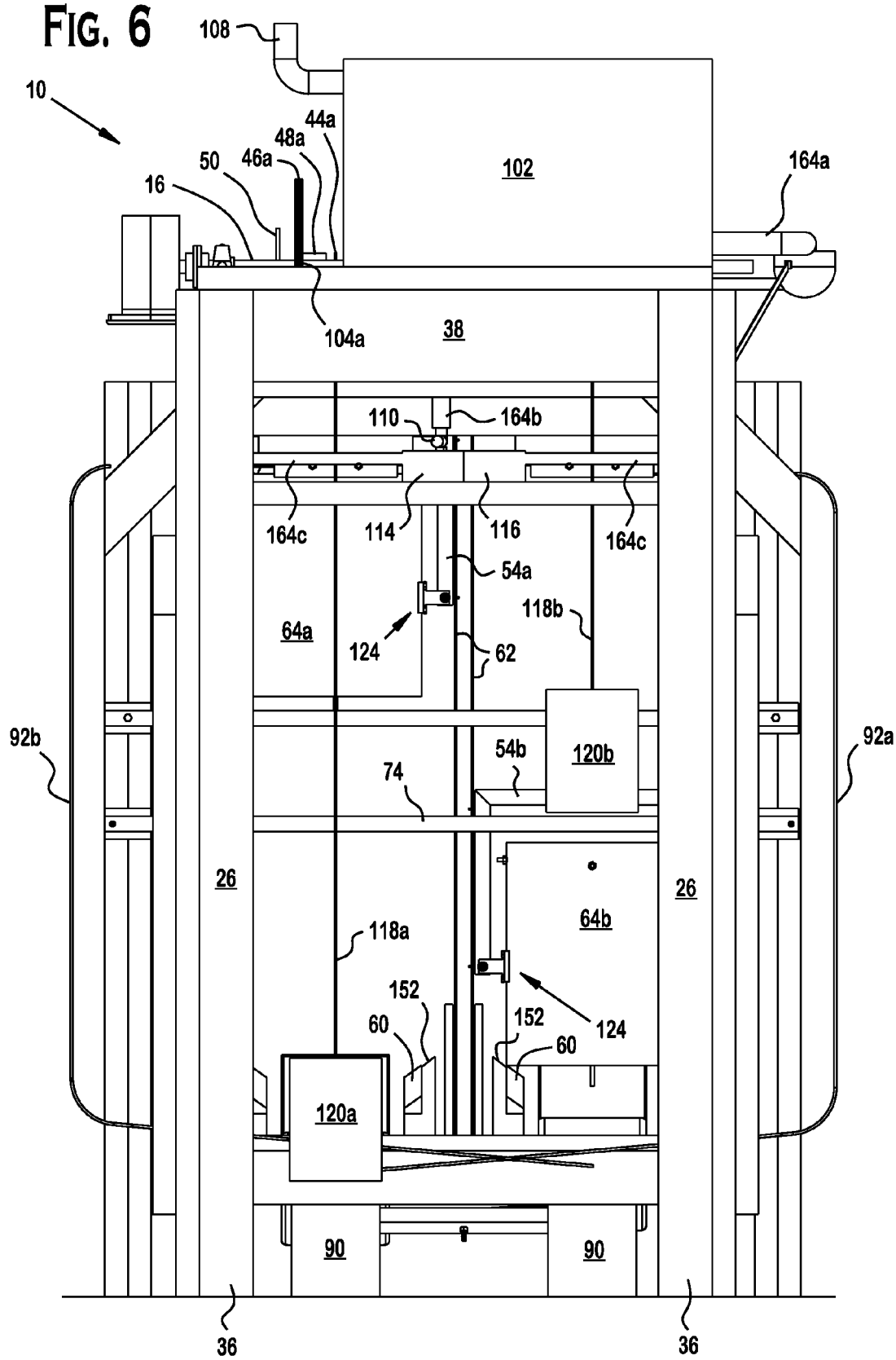
FIG. 6 is a rear view of the power plant of FIG. 1.
Figure 7:
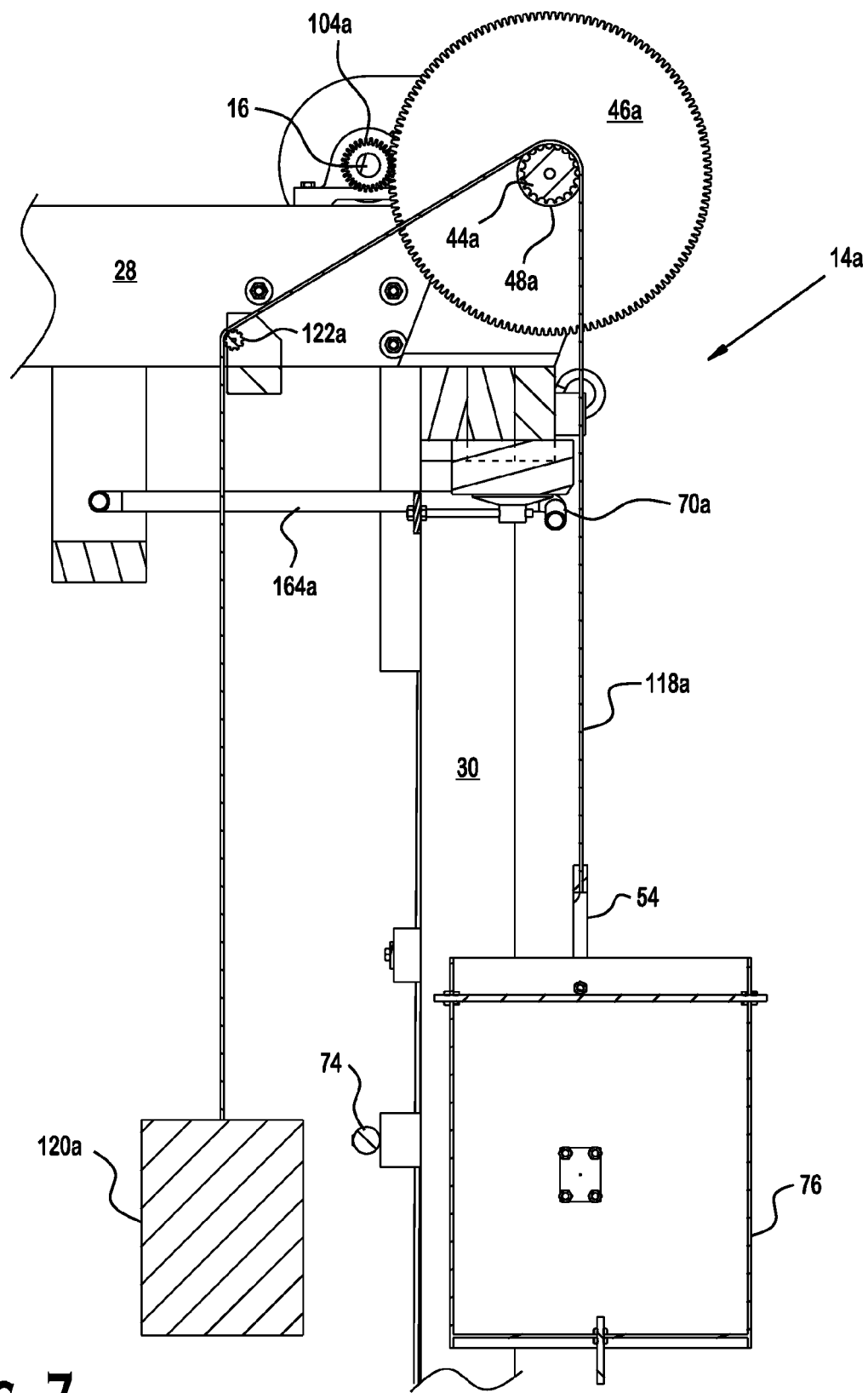
FIG. 7 is a partial section view of the power plant of FIG. 3, showing the right side reciprocating engine about halfway through a power stroke.

Referring to FIGS. 4 and 5, the joists may be used to support the equalization tank 102. The equalization tank (e.g., a fifteen gallon capacity plastic container) may be positioned to receive influent water (or the working fluid) from a water supply via inflow port 108. An outflow port 106 of the equalization tank may be disposed below the inflow port 108 and connected hydraulically to a central water distribution spigot 110. Referring to FIGS. 6, 15 and 16, piping and fittings 164a may connect the outflow port 106 to a spigot feed drop basin 112. Additional fittings and piping 164b may connect the spigot feed drop basin 112 to the spigot 110 which may be secured to the joist. The spigot 110 may be disposed above (and movable between) a right side drop basin 114 and a left side drop basin 116. These drop basins may be disposed on a beam hung from the ceiling joists. Additional piping and fittings 164*c* may be used to hydraulically connect the right and left side drop basins 114, 116, to the right and left side fill ports 70*a*, 70*b*, respectively.

Figure 3:
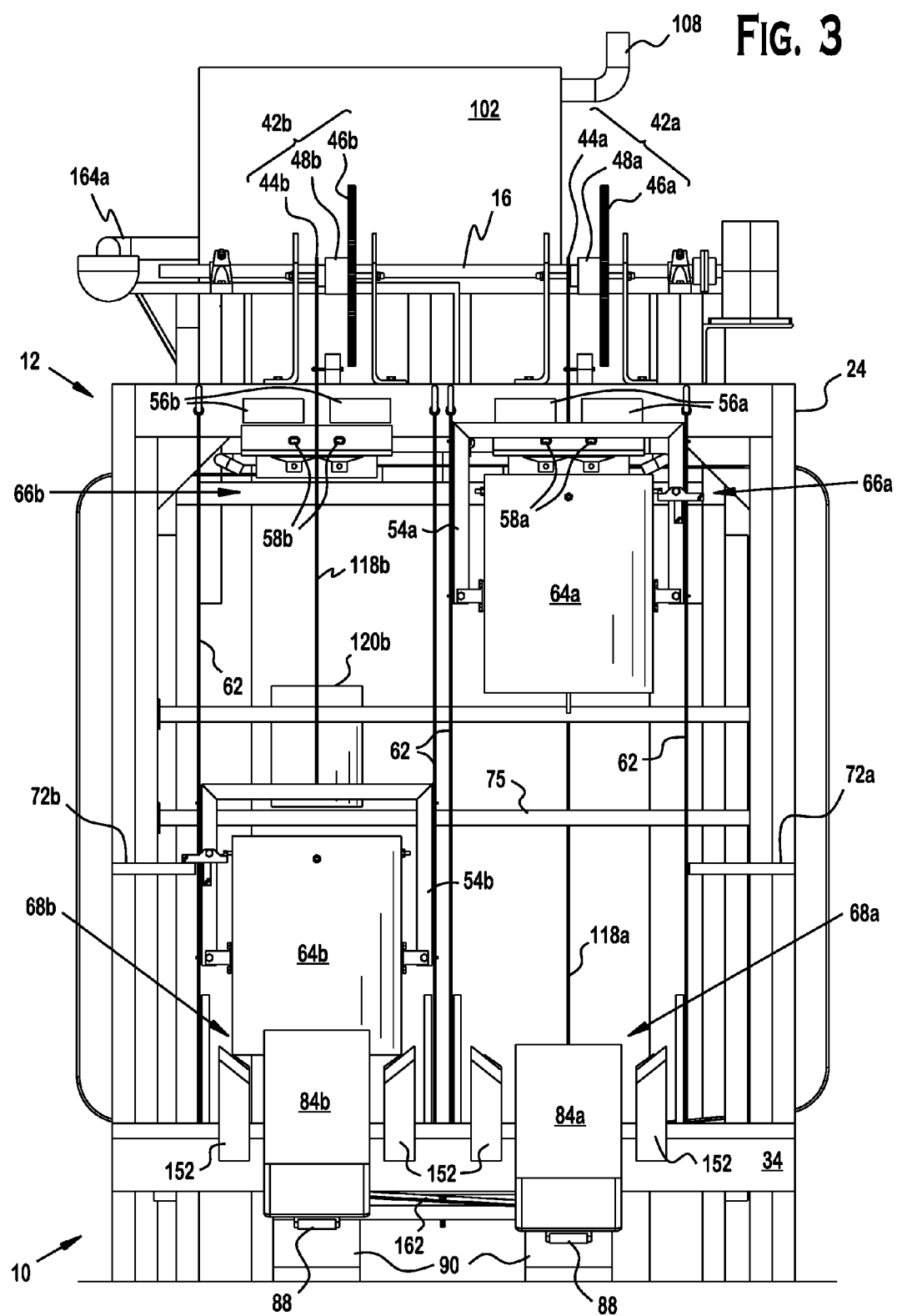
FIG. 3 is a front view of the power plant of FIG. 1.

Referring to FIGS. 1 and 3, the power plant 10 may include two reciprocating engines 14*a*, 14*b*, each of which may be substantially identical to the other. Each reciprocating engine 14*a*, 14*b*, may possess a gear set 42*a*, 42*b*, a bucket mounting frame (or horse shoe bracket) 54*a*, 54*b*, a bucket (or similar container) 76*a*, 76*b*, a drive chain 118*a*, 118*b*, and a counterweight 120*a*, 120*b*. The gear set 42*a*, 42*b* of each reciprocating engine 14*a*, 14*b* may be positioned adjacent to the power shaft 16 atop the power plant frame 12. As shown in FIG. 17, one end of the drive chain 118*a* may be connected to the bucket mounting frame 54*a*, and the opposite end of the drive chain may be connected to the counterweight 120*a*. The drive chain 118*a* may be drawn over the transmission gear (or bucket gear) 44*a*, and a counter weight positioning gear 122*a*. In one embodiment, the drive chain 118*a* is a bicycle chain, the transmission gear 44*a* is an approximately four inch diameter sprocket on a ten speed bicycle cog set, and the counter weight positioning gear 122*a* is a bicycle rear derailleur. Additionally, the bucket 76*a* may be sized such that when it is nearly full of water, it is sufficiently heavy to pull the drive chain 118*a* about the transmission gear 44*a* and raise the counterweight 120*a* as it descends from the bucket filling station 66*a* located near the top of the frame to a bucket discharge station 68*a* located near the base of the frame. The counterweight 120*a* may be sufficiently heavy such that it quickly, reliably, and smoothly raises the empty bucket assembly 64*a* from the bucket discharge station 68*a* to the bucket fill station 66*a*. In the exemplary embodiment, the power shaft 16 and the gear set 42*a* is approximately five feet from the ground, the bucket 76*a* is a five-gallon bucket, the counterweight 120*a* is a nail container filled with approximately six pounds (5 lbs. 13 oz.) of gravel, and the recoil of the empty bucket assembly 64*a* from the bucket discharge station 68 to the bucket fill station 66 is completed in approximately two seconds.

Additionally, the transmission gear 44*a* may be connected to a ring gear 46*a*. The ring gear 46*a* may have a diameter greater than the transmission gear 44*a*. The circumference of the ring gear may be cut to form a power gear. The ring gear 46*a* may be connected to the transmission gear 44*a* such that the ring gear and the transmission gear rotate about a common axis 52. Moreover, the ring gear 46*a* and the transmission gear 44*a* may be connected such that turning the transmission gear 44*a* in one direction (e.g., clockwise) turns the ring gear 46*a* in the same direction, but turning the transmission gear 44*a* in the opposite direction (counter-clockwise) does not. For example, the transmission gear 44*a* may form a free wheel (also known as a block), which possess a single sprocket (or a set of sprockets) mounted on a body that contains an internal ratcheting mechanism 48*a* and mounts on a threaded hub of the ring gear 46*a*. Referring to FIG. 1, the transmission gears 44*a*, 44*b* may be a free wheel from a ten speed bicycle. The gear sets 42*a*, 42*b* of the reciprocating engines 14*a*, 14*b* may be modified to accommodate differing operating conditions. For instance, certain applications may require the availability of multiple gear ratios, and thus the transmission may include a gear box or similar mechanism to selectively control the overall gear ratio for the power plant transmission over a range of gear ratios. For example, the range of gear ratios may be selected from gear ratios ranging from about 0.1:1 to 100:1.

As shown in FIGS. 1 and 3, the bucket mounting frame 54*a*, 54*b* may be secured to the bucket 76*a*, 76*b* by a connecting mechanism 124 such that the connecting mechanism forms a swivel joint between the bucket mounting frame 54*a*, 54*b* and the bucket 76*a*, 76*b*. For example, two connecting mechanisms 124 may lay along an axis perpendicular to the longitudinal axis of the bucket mounting frame 54*a*, 54*b* such that the bucket and the bucket mounting frame form a hinge. As shown, in FIG. 8, the connecting mechanism may be located below the center of gravity 126 of the bucket 76. The connecting mechanism 124 may be offset from the vertical center line of the bucket so that the center of gravity of the bucket 126 creates a tipping moment about the pivot axis 128 of the hinge (see also, FIGS. 13 and 14).

Figure 9:
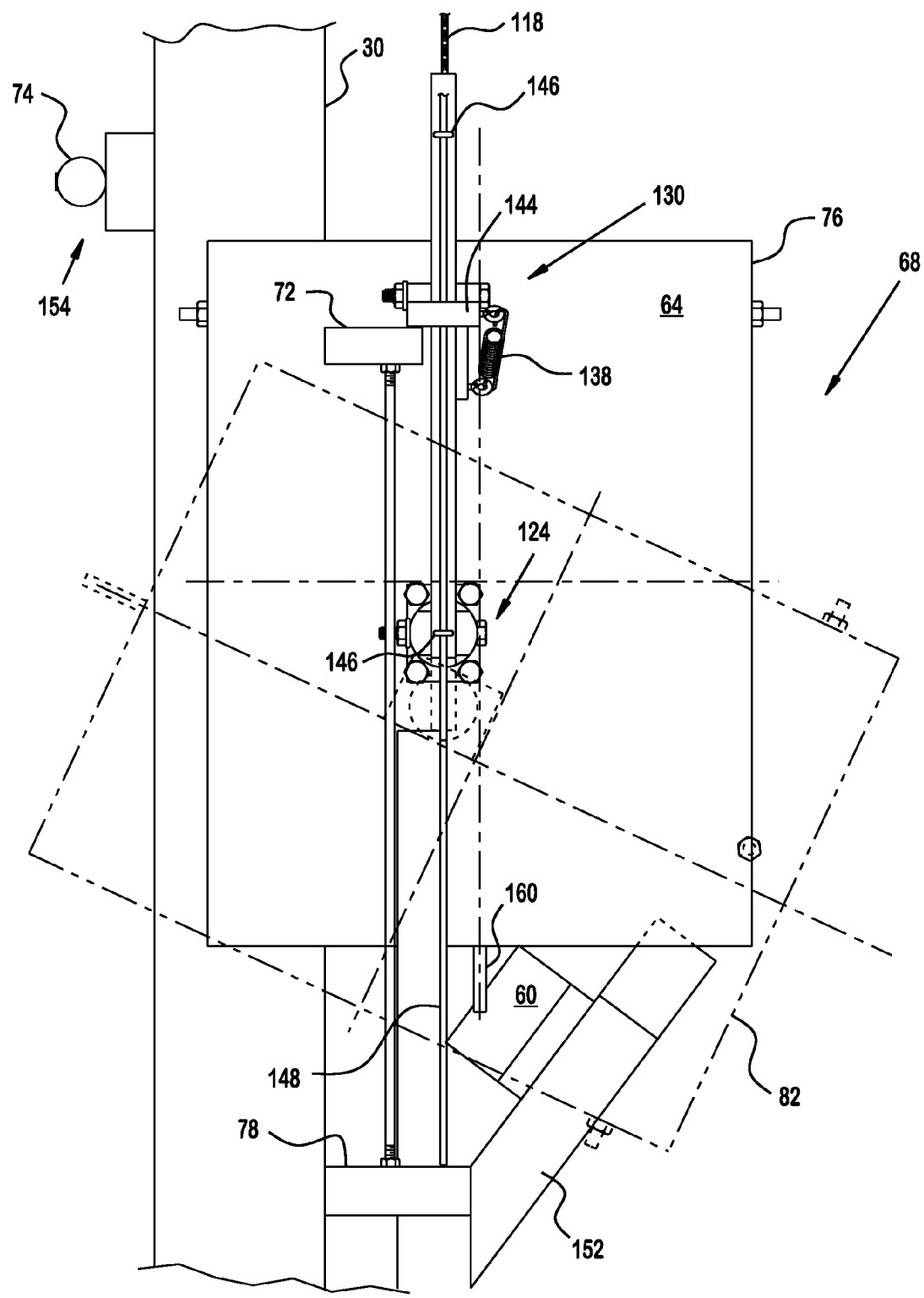
FIG. 9 is a side view of the left side bucket assembly at the bucket discharge station.
Figure 10:
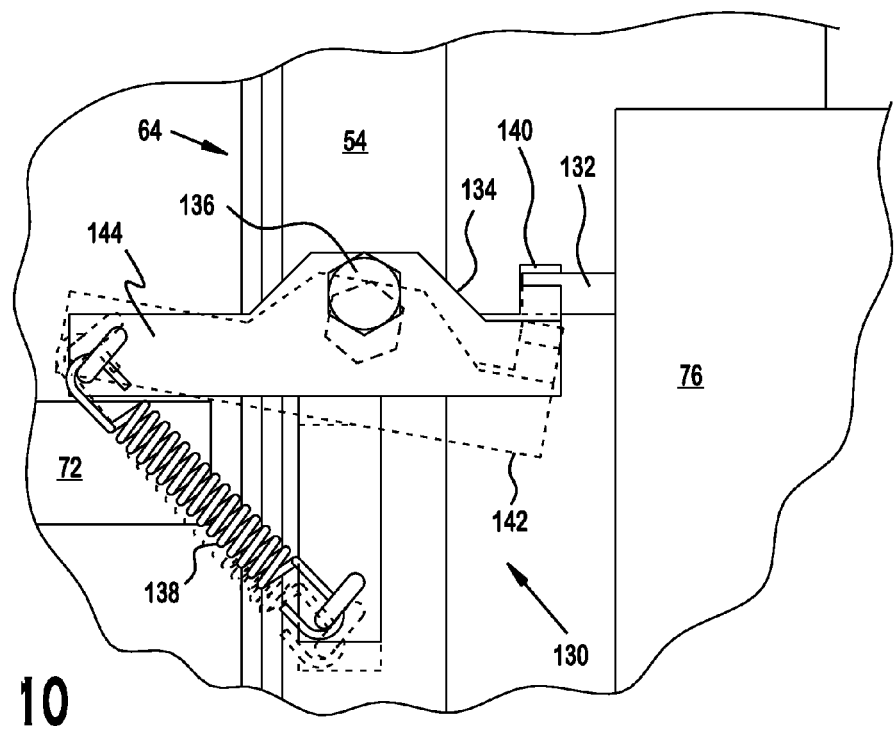
FIG. 10 is a front view of a bucket locking mechanism.

Referring to FIG. 10, the bucket mounting frame 54 includes a locking mechanism 130 for selectively locking the bucket in a vertical configuration. For example, the locking mechanism 130 may be a latch. In the exemplary embodiment, a strike 132 is secured to the bucket 76 and a catch 134 is secured to the bucket mounting frame 54. The catch 134 may be connected to the bucket mounting frame 54 such that the catch 134 oscillates about a trip switch pivot 136. The catch 134 may be biased with a resilient member (e.g., coil spring) 138 in a closed configuration 140 such that one end of the catch is interposed against (or interlocked with) the strike 132 and another portion of the catch 144 projects outwardly from the bucket mounting frame 54 to form a lever arm. To release the latch 130 from the closed configuration 140, a trip switch activator 72, which may be a static member, pushes against the lever arm 144 upward as the bucket 76 descends, causing the lever arm 144 to rotate about the trip switch pivot 136 and separate the catch 134 from the strike 132. This leaves the bucket 76 free to rotate about the pivot axis 128 of the connecting mechanism 124. As described above in connection with FIG. 9, the pivot axis 128 may be located such that the weight of the bucket 76 creates a movement about the pivot axis to facilitate tipping of the bucket and the release of water at the bucket discharge station 68.

Figure 11:
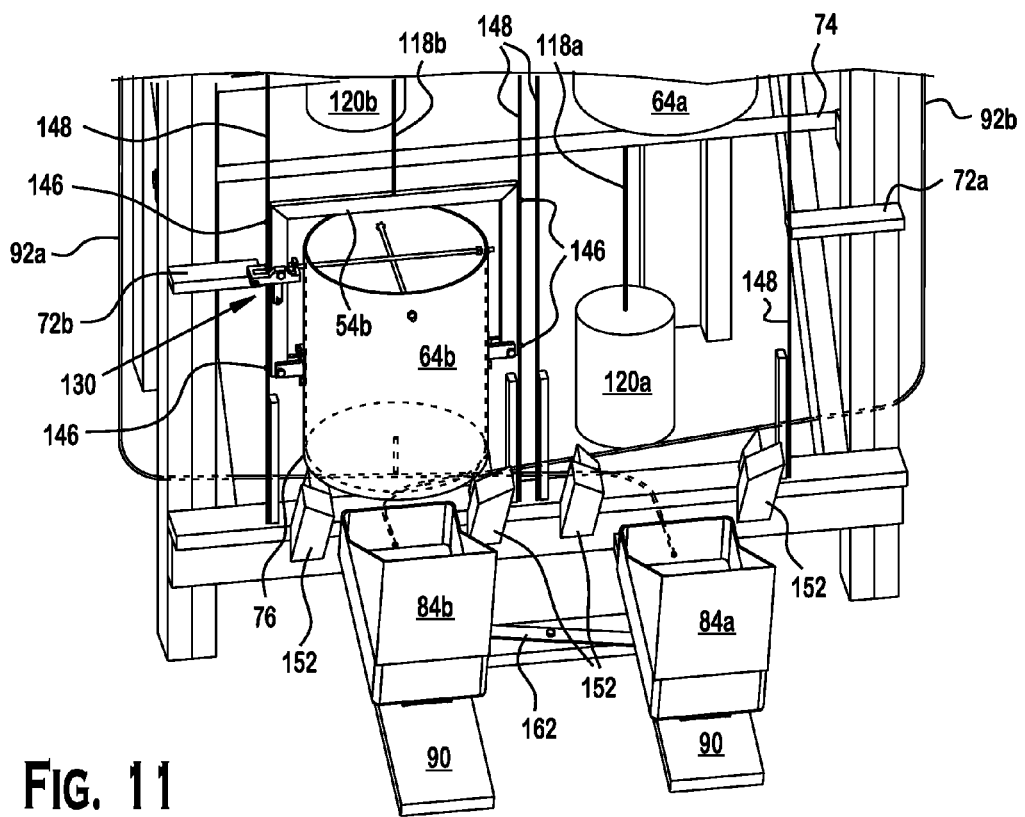
FIG. 11 is a front perspective view of the water discharge system.

Referring to FIG. 11, the side of the bucket mounting frame 54*b* may include screws with a looped head 146. Four guide wires 148 may extend from the ledge 78 to the top of the frame 12 (not shown). The guide wires 148 may pass through the looped head screws 146 to provide a working area (or track), which restrains movement of the bucket mounting frame 54.

Figure 8:
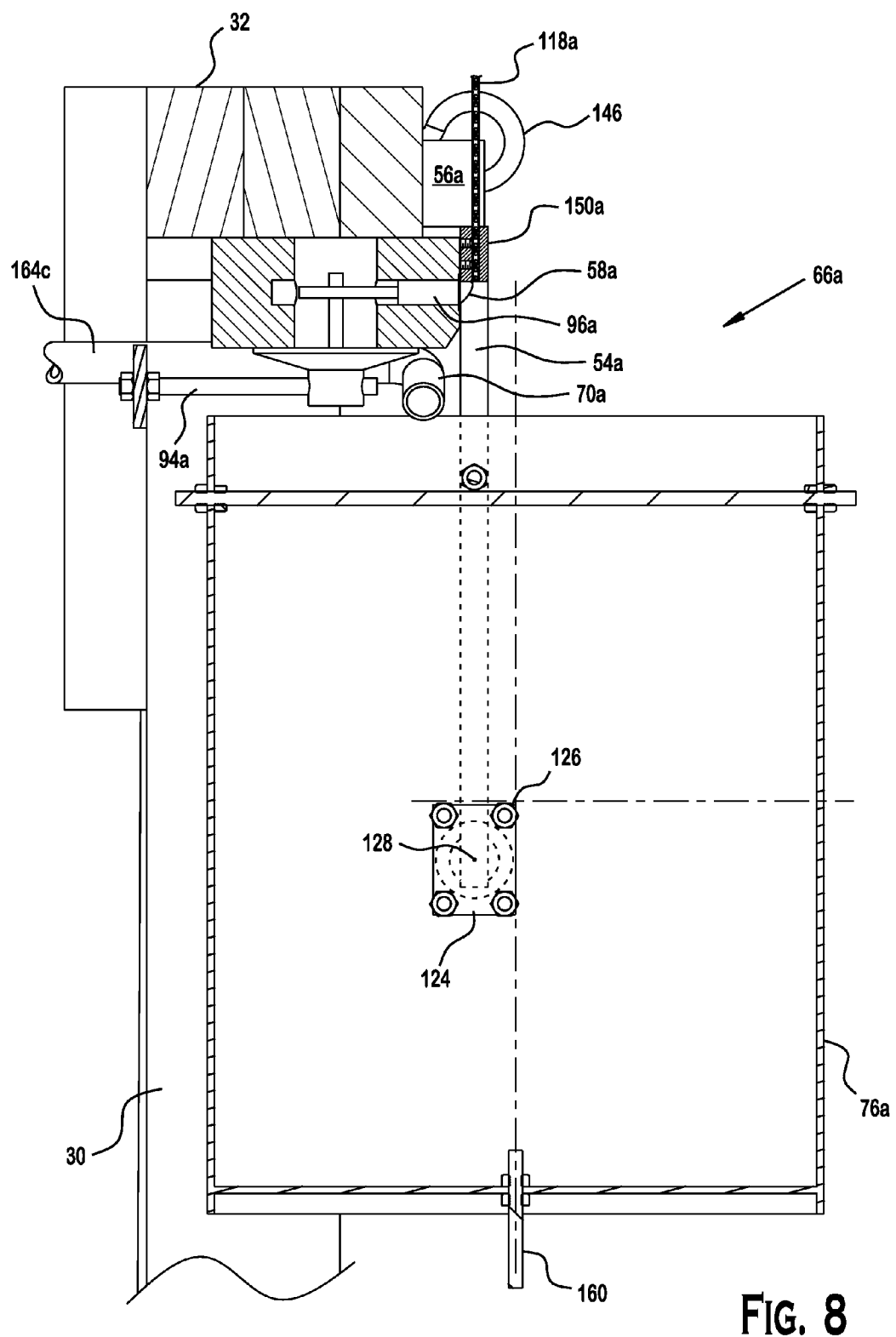
FIG. 8 is a partial sectional view of the right side bucket assembly at the bucket filling station.

Referring to FIG. 8, the bucket mounting frame (or horseshoe bracket) 54*a* of the reciprocating engine 14*a* may be secured in the bucket filing station (or top position) 66*a* by a static upper stop 56*a* and a selectively movable lower stop 58*a* on the power plant frame 12. The selectively movable lower stop 58*a* may be formed from a latch bolt 96*a*. The latch bolt 96*a* may be a spring loaded bolt with an angled edge. In the exemplary embodiment, the cross member 150 of the bucket mounting frame 54*a* rests on top of the flat edge of two latch bolts 58*a*. Each latch bolt may be a latch bolt from a door lock. Each latch bolt may be retracted by rotating a lever 94*a* in the same manner as turning a door knob.

Referring to FIG. 9 the trip switch activator 72 may be positioned below the lever arm 144 of the locking mechanism 130. Referring to FIG. 10, as the bucket assembly 64 descends, the lever arm 144 contacts the trip switch activator 72 pushing the lever arm 144 up and releasing the strike 132. Referring to FIG. 9, although the trip switch activator 72 may be a stop (or a block on a threaded rod) any suitable device may be used to release the locking mechanism 130 provided the device releases the locking mechanism 130 as the bucket assembly 64 arrives at the bucket discharge station 68. The height of the trip switch activator 72 may be adjustable to allow adjustment of the location and timing at which the locking mechanism 130 is released to discharge water from the bucket. In addition, angled static members (or kick plates)

152 may be positioned on the discharge side of the bucket to push the bucket 76 about the pivot 128 (FIG. 8) as the bucket descends to the bucket discharge station 68. To guide the motion and extent of bucket repositioning at the bucket discharge station 68, kick plates 152 may be located on opposite sides of the bucket 76.

Figure 12:
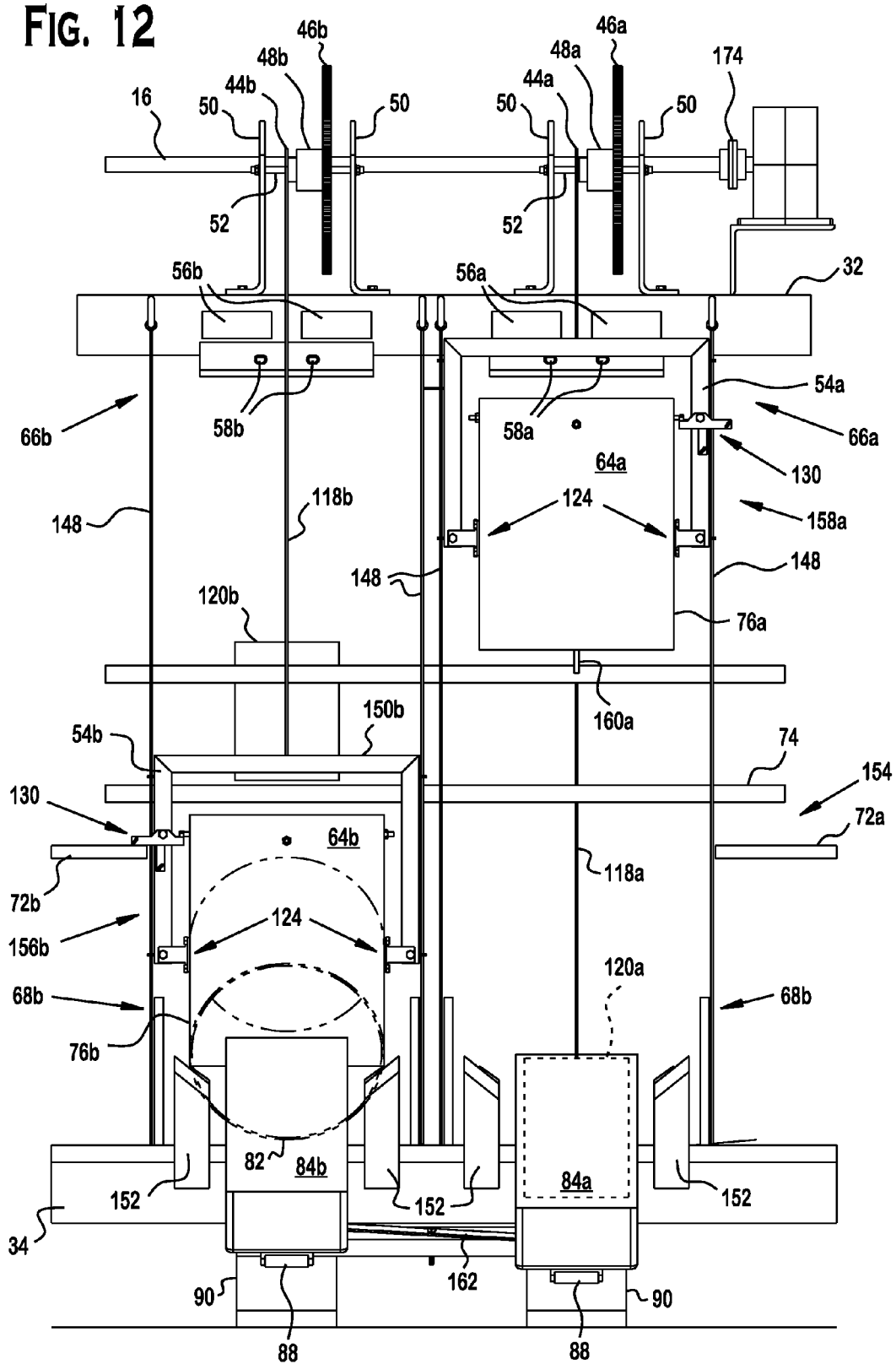
FIG. 12 is a front view of one operational configuration of the power plant of FIG. 1 showing the right side bucket assembly at the bucket filling station and the left side bucket assembly at the bucket discharge station.

Referring to FIGS. 12-14, each reciprocating engine 14a, 14b, includes a bucket recoil mechanism 154a, 154b, which automatically moves the bucket assembly 64a, 64b from the discharge configuration 156a, 156b into the fill configuration 158a, 158b. As shown in FIGS. 9 and 14, a longitudinal member 160a, 160b extends from the bottom of the bucket 76a, 76b. In the exemplary embodiment, the longitudinal member 160a, 160b is a threaded steel rod approximately 1¼ inches in length. The longitudinal member may be configured and dimensioned to encounter the horizontal brace 74 of the frame 12. Preferably, the recoil rate of the bucket assembly 64a, 64b is sufficient to cause the impact to the longitudinal member (or bucket kick) 160a, 160b from the horizontal brace 74 to create a moment about the bucket pivot 128 that is sufficient to swing the bucket 76a, 76b into a vertical position and secure the bucket 76a, 76b in the locking mechanism 130 of the bucket assembly 64a, 64b.

Referring to FIGS. 15 and 16, the water distribution system may include a fifteen gallon tank (not shown), an L-shaped spigot 110, a right side drop basin 114, a left side drop basin 116, and associated piping and fittings 164c for conveying water under gravity flow from the right and left side drop basins 114, 116 to each respective bucket fill port 90a, 90b. As shown in FIG. 1, tank 102 may have a water supply port 108 and may receive the external water supply. The tank may be sized to equalize the flow rate to the power plant. The tank 102 may be hydraulically connected to the spigot 110. Referring to FIGS. 15 and 16, the spigot 110 may be free to rotate from a first position over the right side drop basin 114 (FIG. 15.) and a second position over the left side drop basin 116 (FIG. 16). The spigot 110 may be connected to a lever arm 98 such that when the lever arm swings toward the right side drop basin, the spigot is positioned over the left side drop basin. Moreover, when the lever arm swings toward the left side drop basin, the spigot may be positioned over the right side drop basin. The piping and fittings from the right side drop basin 114 are configured and dimensioned to convey water to a right side bucket fill port 90a. The piping and fittings from the left side drop basin 116 are configured and dimensioned to convey water to the left side bucket fill port 90b.

Additionally, the power plant 10 may include a water discharge system 20. Referring to FIGS. 15-17, each reciprocating engine 14a, 14b discharges water from the bucket 76a, 76b to a sieve (or water catch) 84a, 84b. The water catch 84a, 84b is a container 86 that is mounted on a set of rollers 88 (FIG. 17). The rollers 88 are disposed on a ramp 90 which slopes away from the base of the frame. As shown in FIGS. 15 and 16, the water catches 84a, 84b are connected by an elongate member 162 that is free to pivot about a point approximately midway between the water catches. A steel cable 92a enclosed within a brake line hose connects the right water catch 84a to the latch bolt handles 94b on the left side of the frame. Similarly, another steel cable 92b enclosed within another brake line hose connects the left water catch 84b to the latch bolt handles 94a on the right side of the frame. The lever arm 98 of the spigot 110 is connected to the latch bolt handles 94a, 94b on the left and right sides of the frame.

The power plant 10 may include a control system 22 for operating the reciprocating engines 14a, 14b in alternating (or lead-lag) operation. The water catches 84a, 84b, spigot lever 98, and latch bolt handles 94a, 94b may interconnect to form a mechanical control system for the power plant. For example, in FIG. 15 the right side bucket mounting frame 54a is in the bucket fill position, resting on the pair of latch bolts 58a. In this operable configuration, the right side bucket mounting frame is latched to the frame 12 such that the right side bucket is positioned under the right side bucket fill port 90a. By contrast, the left side bucket mounting frame 54b is unlatched from the frame 12 and the left side bucket assembly 64b is free to descend with the added weight of water that would be contained in the left side bucket 76b. The left side water catch 84b is positioned at the top of the ramp 90 near the left side bucket discharge station 68b. Accordingly, the left side water catch 84b is positioned to harness kinetic and potential energy from the water discharged at the left side bucket discharge station 68b. More particularly, the energy transfer may be sufficient to propel the water catch 84b down the ramp 90 and to pull the steel cable 92b that connects the left side water catch 84b to the right side latch bolt handles 94a, and by extension the spigot lever 98, and the left side latch bolt handles 94b. Additionally, the energy transfer may be sufficient to simultaneously pivot the right side water catch 84a to the top of the ramp 90 near the right side bucket discharge station 68a.

By contrast, in FIG. 16 the bucket mounting frame 54b on the left side rests on the pair of latch bolts 58b. In this operable configuration, the left side bucket mounting frame 54b is latched securely to the frame 12 and the left side bucket assembly 64b is positioned underneath the left side bucket fill port 90b. By contrast, the right side bucket mounting frame 54a is unlatched from the frame 12 and the right side bucket assembly 64a is free to descend with the added weight of water that would be contained in the right side bucket 76a. The right side water catch 84a is positioned at the top of the ramp 90 near the right side bucket discharge station 68a. Accordingly, the right side water catch 84a is positioned to harness kinetic and potential energy from the water discharged at the right side bucket discharge station 68a. More particularly, the energy transfer may be sufficient to propel the water catch down the ramp 90 and to pull the steel cable 92a that connects the right side water catch 84a to the left side latch bolt handles 94b, and by extension the spigot lever 98, and the right side latch bolt handles 94a. Additionally, the energy transfer may be sufficient to simultaneously pivot the left side water catch 84b to the top of the ramp 90 near the left side bucket discharge station 68b.

In use, water is delivered to the equalization tank 102 at the top of the power plant. Referring to FIG. 4, under gravity flow, water exits the equalization tank 102 through a series of pipes and fittings 164a, 164b and is delivered to the spigot 110 which is positioned over the right side drop basin 114 or the left side drop basin 116. Referring to FIG. 15, the spigot 110 initially may be positioned above the right side drop basin 114 to deliver water to the right side bucket 76a, as the left side bucket 76b, which has already been filled with water, descends. The right bucket mounting frame 54a is seated securely on the right side latch bolts 58a. This positions the right side bucket assembly 64a under the water discharge port 90a at the right side bucket fill station 66a. Referring to FIG. 3, as the left side bucket assembly 64b descends from the left side bucket fill station 66b to the left side bucket discharge station 68b, the left side bucket mounting frame 54b pulls the left side drive chain 118b over the left side transmission gear 44b. The rotation of the left side transmission gear 44b rotates the left side ring gear 46b and the left side ring gear 46b rotates the left side power gear (not shown) that is fixed on the power shaft 16. Toward the end of the power stroke, the left side bucket assembly 64b approaches the left side trip switch activator 72b. Referring to FIG. 10, the trip switch activator 72 lifts the lever arm 144 up to release the strike 132. As depicted in FIG. 17, the unlatched bucket 76a rotates away from the bucket mounting frame 54a and the water inside the bucket is dumped. This produces a weight imbalance between the empty bucket 76a and the counterweight 120a, which descends pulling the bucket mounting assembly 64a upward. As the bucket assembly 64a passes by the horizontal brace 74, the longitudinal member (or bucket kick) 160a on the bottom of the bucket 76a hits the horizontal brace 74. The force of this collision pivots the bucket 76a into an upright, vertical position and re-latches the bucket to the bucket mounting frame 54a. Referring to FIG. 15, water discharged from the bucket 76b falls on the left side water catch 84b and pushes it down the ramp 90. The movement of the left side water catch 84b pulls the attached cable 92b, which redirects the spigot 98 to the left side water drop basin 116 and retracts the right side latch bolts 58a to release the right side bucket mounting frame 54a and start the power stroke of the right reciprocal engine 14a. By contrast, the left side bucket mounting frame 54b moves upward and slides against the angled edges of the latch bolts 58b. The angled edges of the latch bolts allow the left side bucket mounting frame 54b to push the latch bolts 58b into the frame and pass. Once the bucket mounting frame passes the latch bolts 58b, the respective latch springs re-extend the latch bolts 58b. The bucket mounting frame 54b is raised by the counterweight 120b until the top of the cross member of the bucket mounting frame 150b contacts the left side fill position stop 56b. The left side bucket mounting frame 54b then seats securely on the latch bolts 58b. This positions the left side bucket 76b under the water fill port at the left side bucket fill station 66b (FIG. 12). Preferably, the left side bucket 76b will fill to near capacity during the time the right side bucket assembly 64a descends from the right side fill station 66a to the right side discharge station 68a. Upon reaching the right side discharge station 68a, the right side trip switch activator 72a releases the right side locking mechanism. Water in the right side bucket 76a is discharged. The right side bucket assembly 64a is raised by the counter weight 120a and reset to the right side bucket fill station 66a in the manner described for the left side reciprocating engine 14b. In this manner, lead-lag operation of the reciprocating engines 14a, 14b of the power plant 10 may be implemented.

Figure 18:
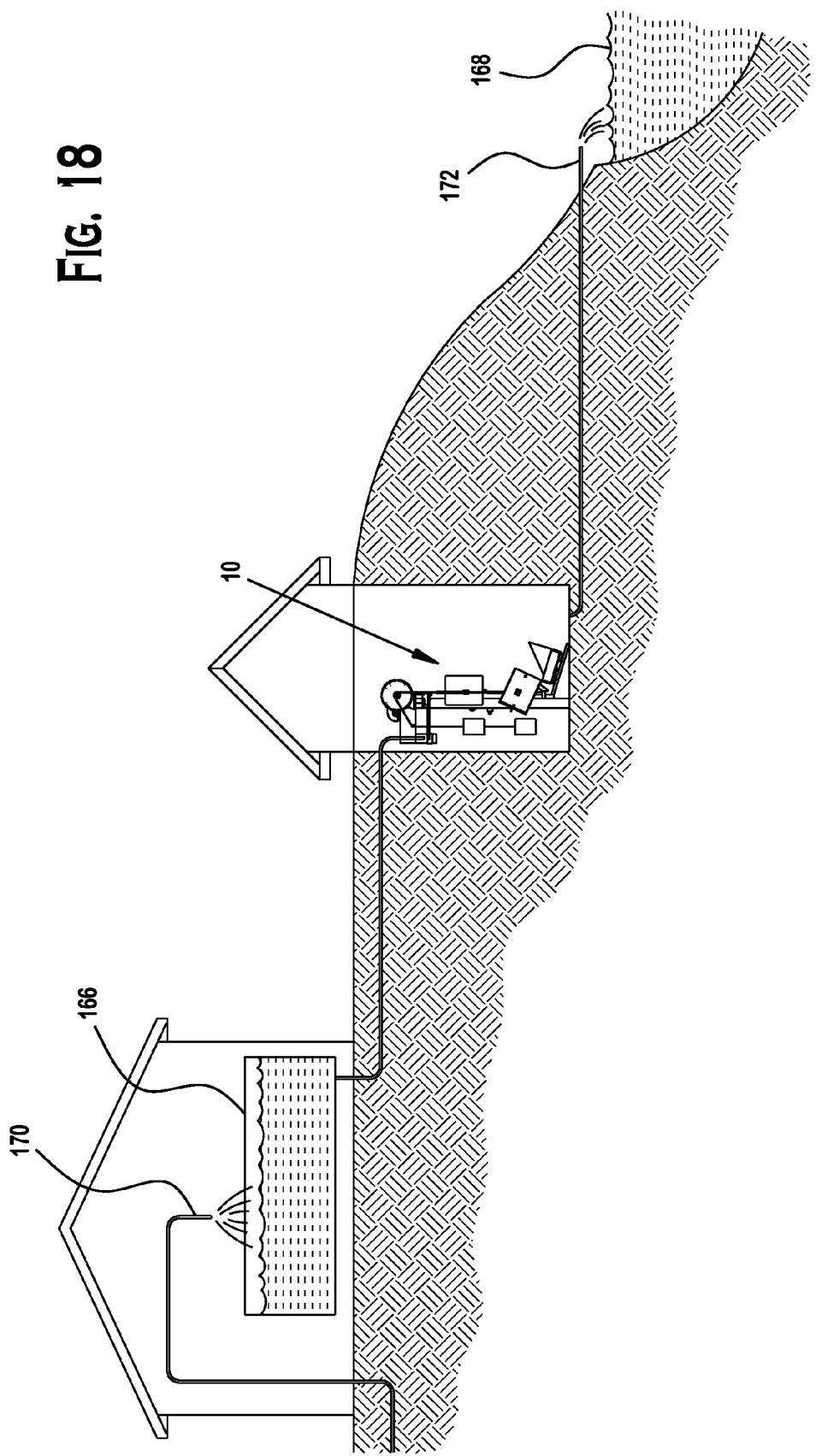
FIG. 18 is a schematic diagram of the power plant of FIG. 1 situated between a hatchery fish tank and a pond.

FIG. 18 shows a schematic view of a power plant according to the present invention. The power plant 10 may be situated down gradient of a hatchery fish tank 166 and up gradient of a pond 168. The power plant 10 may be designed for low head and low flow operating conditions. More specifically, the power plant may operate with a water flow of 5 gallons per minute or less and a total head of approximately 5 feet. The power plant, however, may be designed for larger (or smaller) flows. For instance, at larger flow rates the buckets may be greater in size than 5-gallon buckets. Thus, the bucket and bucket assemblies and other components may be sized or optimized based on the flow rate. As shown in FIG. 18, a fish tank 166 may be supplied water for a single pass flow through by a spring or other water supply having a total dynamic head of approximately 18 feet.

Discharge from the hatchery fish tank may drain to a collection reservoir or equalization tank 102 associated with the low flow power plant. At a discharge flow rate of 5 gallons per minute, the low flow power plant may be operable provided there is sufficient vertical elevation between the collection reservoir and the discharge of the low flow power plant. In the example shown in FIG. 18, the difference in elevation between the collection reservoir 102 and the discharge of the low flow power plant is approximately 6 feet. The discharge of the low flow power plant may flow under gravity through a conduit or channel 172 to a watercourse or sanitary sewer.

In the example depicted in FIG. 18, the power plant discharge flows by gravity through a buried pipe 172 to a pond 168 situated at a lower elevation. The low flow power plant depicted in FIG. 18 may accumulate water as a working fluid under low flow conditions and transfer the potential energy of the accumulated water into a continuous rotational movement of a drive shaft. The rotating driveshaft may be coupled to a device and used as a source of mechanical power. For example, the rotating drive shaft may be connected to a pump that may be used to recycle water from the pond 168 to the fish tank 166. In another example, the drive shaft may be coupled to an aeration system.

Figure 19:
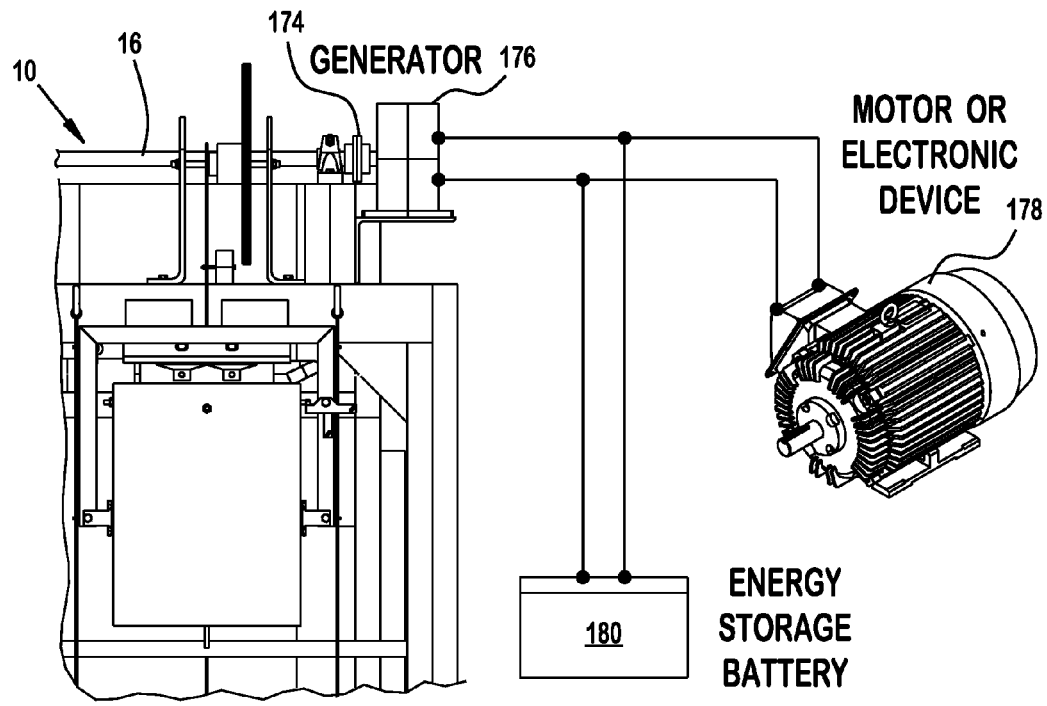
FIG. 19 is a schematic diagram of the power plant of FIG. 1 with a power take off connected to an electric generator that is used to power electrical equipment or devices.

Referring to FIG. 19, the rotating driveshaft 16 may be coupled to a generator 176 which transforms the rotational movement of the driveshaft into electricity. The electricity may be used to power an electrical device 178, including, without limitation, process controls, a computer, communication devices, a crank radio, a battery charging station, or other electrical or electronic equipment.

Figure 20:
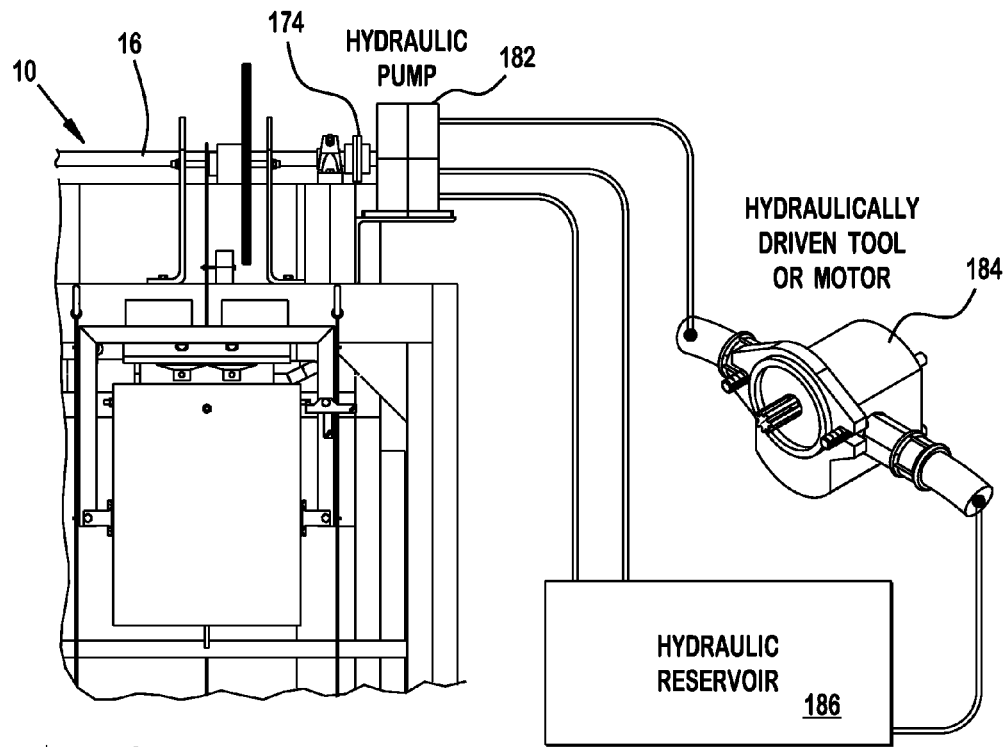
FIG. 20 is a schematic diagram of the power plant of FIG. 1 with a power take off connected to a hydraulic pump that is used to operate a hydraulic drive system.

Referring to FIG. 20, the rotating driveshaft 16 may be coupled to a hydraulic pump 182 which may be used to force hydraulic working fluid through a hydraulic circuit. In this manner, hydraulic fluid may be transmitted to a hydraulically driven apparatus 184 (e.g., a hydraulic motor or cylinder) from a reservoir 186.

Figure 21:
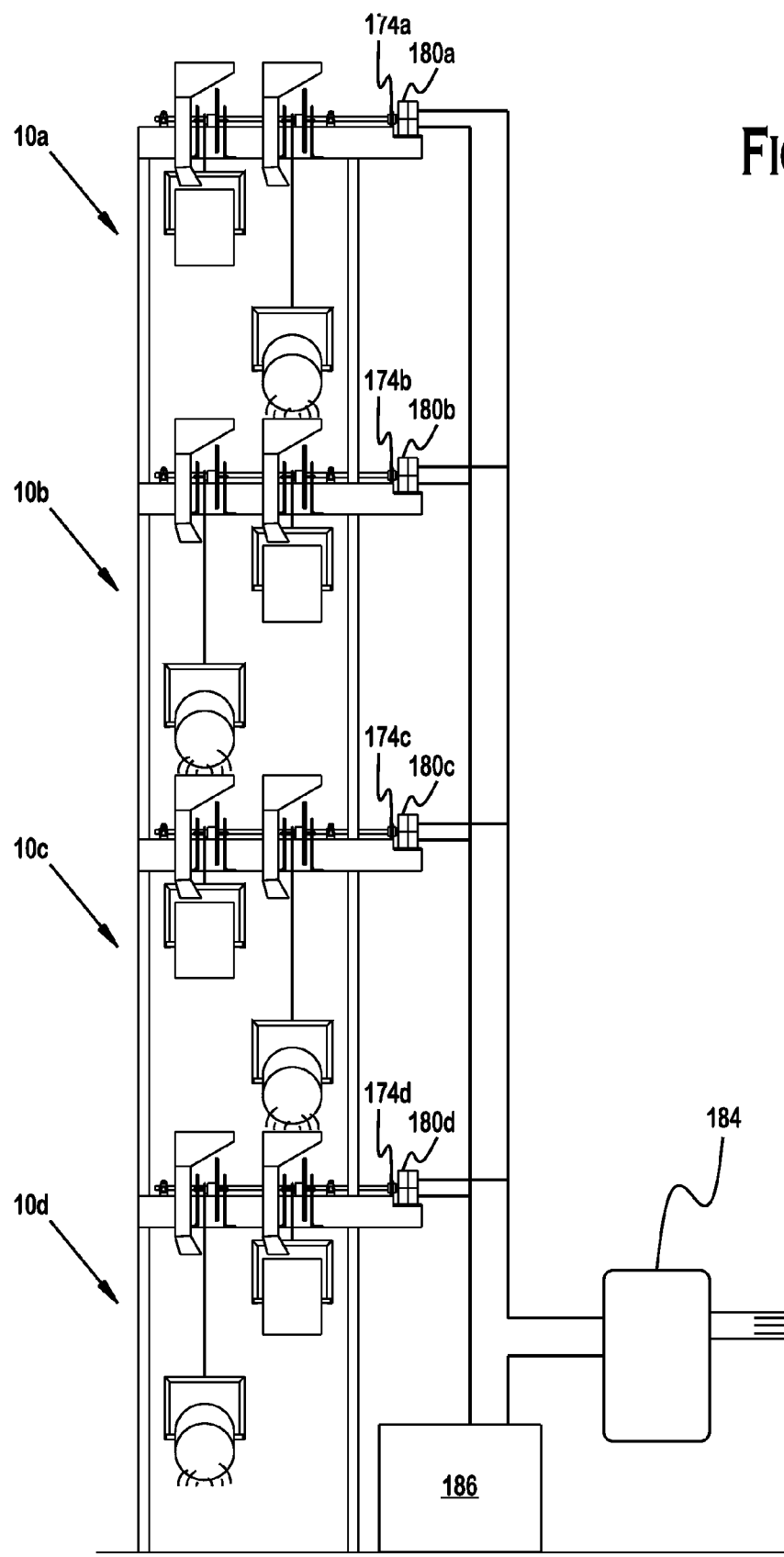
FIG. 21 is a schematic diagram of multiple power plants of FIG. 1 with hydraulic pumps connected in series to drive the hydraulic motor.

Referring to FIG. 21, the power plant 10 may be connected in series such that the discharge of one unit at a higher elevation is collected and conveyed to another unit situated at a lower elevation. For example, in FIG. 21 four low flow power plants of FIG. 1 10a, 10b, 10c, 10d are combined in series. Multiple unit configurations may be used in buildings or suitable topographic areas to capture energy from captured storm water, discharged grey water or waste water. As described above, the gearing of the reciprocating engines may be adjusted to accommodate differing flow conditions. The power take off 174a, 174b, 174c, 174d of the four units depicted in FIG. 12 are each connected to a hydraulic pump 180a, 180b, 180c, 180d, which are connected in series to operate a hydraulic device 184. Other process controls, such as flow rate valves, may be used to regulate operation of the power plant. The power for operating these process controls and equipment may be derived from one or more of the low flow power plants in a multiple unit configuration.

While it has been illustrated and described what at present are considered to be preferred embodiments of the present invention, it will be understood by those skilled in the art that various changes and modifications may be made, and equivalents may be substituted for elements thereof without departing from the true scope of the invention. Additionally, features and/or elements from any embodiment may be used singly or in combination with other embodiments. Therefore, it is intended that this invention not be limited to the particular embodiments disclosed herein, but that the invention include all embodiments falling within the scope and the spirit of the present invention.

What is claimed is:

1. An apparatus for harnessing power from a low flow source of working fluid comprising:
    a power shaft which comprises,
        a first end,
        a second end spaced from the first end, and
        a first power gear disposed between the first end and the second end;

a first reciprocating engine situated proximate to the power shaft and connected to the first power gear for delivering a power stroke and which comprises
a first bucket assembly which includes
a first bucket mounting frame,
a first bucket,
a first connecting mechanism that connects the first bucket to the first bucket mounting frame to form a first hinge that pivots about a first pivot axis such that the first bucket creates a turning moment about the first pivot axis, and
a first locking mechanism for selectively locking the first bucket in the first bucket mounting frame;
a first bucket filling station for filling the first bucket with working fluid and which comprises
a first upper stop,
a first lower stop, the first lower stop being selectively moveable between a first deployed position and a first retracted position, and
a first lever for selectively retracting the first lower stop and which is moveable between a first closed position and a first open position such that when the first lever is in the first closed position the first stop is in the first deployed position and when the first lever is in the first open position the first stop is in the first retracted position;
a working fluid distribution system for delivering working fluid to the first reciprocating engine which comprises,
a tank for storing working fluid;
a first fill port in fluid communication with the tank; and
a working fluid discharge system for discharging working fluid from the first reciprocating engine to complete the power stroke, and which comprises a first trip switch activator for releasing the first bucket assembly locking mechanism; and
a control system for resetting the first reciprocating engine following the power stroke.

2. The apparatus of claim 1, wherein the first reciprocating engine further comprises:
a first counterweight,
a first drive chain which comprises
a first portion being connected to the bucket assembly,
a second portion being connected to the first counterweight, and
a third portion interconnecting the first portion and the second portion, and
a first gear set which comprises a first ring gear in working contact with the first power gear for transmitting rotational motion to the power shaft.

3. The apparatus of claim 2, wherein the first reciprocating engine further comprises a first positioning gear being disposed between the first gear set and the first counter weight.

4. The apparatus of claim 2, wherein the first gear set further comprises:
a first transmission gear in working contact with the third portion of the first drive chain, and
a first ratcheting mechanism being disposed between the first ring gear and first the transmission gear such that rotating the first transmission gear drives the first ring gear in the same direction and counter-rotating the first transmission gear does not affect rotation of the first ring gear.

5. The apparatus of claim 4, further comprising:
a second power gear disposed on the power shaft between the first power gear and the second end; and a second reciprocating engine proximate to the power shaft and being connected to the second power gear, which comprises,
a second bucket assembly, and
a second gear set which comprises a second ring gear in working contact with the second power gear for transmitting rotational motion to the power shaft.

6. The apparatus of claim 5, wherein the second reciprocating engine further comprises:
a second counterweight,
a second drive chain which comprises
a fourth portion connected to the second bucket assembly,
a fifth portion connected to the second counterweight, and
a sixth portion interconnecting the fourth portion and the fifth portion.

7. The apparatus of claim 6, wherein the second reciprocating engine further comprises:
a second transmission gear in working contact with the sixth portion of the second drive chain, and
a second ratcheting mechanism being disposed between the second ring gear and the second transmission gear such that rotating the second transmission gear drives the second ring gear in the same direction and counter-rotating the second transmission gear does not affect rotation of the second ring gear, and
a second positioning gear being disposed between the second gear set and the second counter weight.

8. The apparatus of claim 5, further comprising a second bucket filling station which comprises
a second upper stop,
a second lower stop, the second lower stop being selectively moveable between a second deployed position and a second retracted position, and
a second lever for selectively retracting the second lower stop which comprises a second closed position and a second open position such that when the second lever is positioned in a second closed position the second stop is in the second deployed position and when the second lever is in the second open position the first stop is in the second retracted position.

9. The apparatus of claim 8, wherein the water distribution system further comprises:
an inflow structure in fluid communication with the tank for conveying working fluid to the apparatus,
an outflow structure in fluid communication with the tank,
a first drop basin situated hydraulically down gradient of the tank and located below a first target location,
a second drop basin situated hydraulically down gradient of the tank and located below a second target location,
a spigot in fluid communication with the outflow structure and disposed between the tank and the first and second drop basins, such that the spigot is moveable from the first target location to the second target location;
a first fill port in fluid communication with the first drop basin and situated above the first bucket assembly,
a second fill port in fluid communication with the second drop basin and situated above the second bucket assembly.

10. The apparatus of claim 9, wherein the first locking mechanism comprises
a first strike secured to the first bucket, and
a first catch, which comprises a first lever arm, and which is secured to the first bucket mounting frame, the first catch being movable between a first closed configuration such that the first strike is interlocked with the first catch to selectively lock the first bucket in the first bucket mounting frame, and a first open configuration such the first strike is not interlocked with the first catch, and the first catch is biased in the first closed configuration and oscillation of the first lever arm away from the first closed configuration positions the catch in the first open configuration.

11. The apparatus of claim 10, wherein the first bucket mounting frame includes a plurality of guides to restrain movement of the bucket mounting frame, and the working fluid discharge system further comprises a first pair of kick plates disposed below the first bucket assembly and a second pair of kick plates disposed below the second bucket assembly.

12. The apparatus of claim 11, wherein the control system further comprises:

a first ramp situated below the first pair of kick plates, a first water catch disposed on the first ramp, the first water catch being linked to the second lever such that movement of the first water catch down the first ramp causes the second lever to move to the second position, and causes the spigot to move to the first target location.

13. The apparatus of claim 12, wherein the control system further comprises:

a second ramp situated below the second pair of kick plates, a second water catch disposed on the second ramp, the second water catch being linked to the first lever, such that movement of the second water catch down the second ramp causes the first lever to move to the second position, and causes the spigot to move to the second target location.

14. The apparatus of claim 13, wherein movement of the first water catch down the first ramp causes the second water catch to move up the second ramp, and movement of the second water catch down the second ramp causes the first water catch to move up the first ramp.

15. The apparatus of claim 14, further comprising a frame for supporting the first reciprocating engine.

16. The apparatus of claim 15, wherein the first bucket includes a first kick and the frame includes a brace such that upward movement of the first bucket assembly away from the first pair of kick plates causes the brace to strike the first kick, rotating the first bucket into a vertical orientation and setting the first locking mechanism in the first closed configuration.

17. The apparatus of claim 1, wherein the second end is connected to a mechanical device such that rotation of the second end powers the mechanical device.

18. The apparatus of claim 17, wherein the mechanical device is selected from the group consisting of a pump or a generator.

* * * * *